US010811644B2

(12) United States Patent
Zhi et al.

(10) Patent No.: US 10,811,644 B2
(45) Date of Patent: Oct. 20, 2020

(54) CONDUCTIVE YARN-BASED NICKEL-ZINC TEXTILE BATTERIES

(71) Applicant: City University of Hong Kong, Kowloon (HK)

(72) Inventors: Chunyi Zhi, Shatin (HK); Yan Huang, Shenzhen (CH); Zijie Tang, Hong Kong (HK)

(73) Assignee: City University of Hong Kong, Kowloon (HK)

( * ) Notice: Subject to any disclaimer, the term of this patent is extended or adjusted under 35 U.S.C. 154(b) by 313 days.

(21) Appl. No.: 15/896,961

(22) Filed: Feb. 14, 2018

(65) Prior Publication Data
US 2020/0136105 A1    Apr. 30, 2020

(51) Int. Cl.
*H01M 2/10* (2006.01)
*H01M 4/38* (2006.01)
(Continued)

(52) U.S. Cl.
CPC ........ *H01M 2/1022* (2013.01); *D03D 1/0088* (2013.01); *D04B 1/22* (2013.01);
(Continued)

(58) Field of Classification Search
None
See application file for complete search history.

(56) References Cited

U.S. PATENT DOCUMENTS

| 4,306,061 A | 12/1981 | Majewicz |
| 5,215,836 A | 6/1993 | Eisenberg |

(Continued)

FOREIGN PATENT DOCUMENTS

| CN | 104240973 A | 12/2014 |
| CN | 105845972 A | 8/2016 |

(Continued)

OTHER PUBLICATIONS

"From Industrially Weavable and Knittable Highly Conductive Yarns to Large Wearable Energy Storage Textiles" published by Huang et al. in ACS Nano vol. 9, No. 5, 4766-4775, 2015.*

(Continued)

*Primary Examiner* — Basia A Ridley
*Assistant Examiner* — Heng M. Chan
(74) *Attorney, Agent, or Firm* — Norton Rose Fulbright US LLP

(57) ABSTRACT

Systems and methods which provide nickel-zinc textile batteries formed from highly conductive yarn-based components which are configured to facilitate textile material processing, such as weaving, knitting, etc., are described. Embodiments of a conductive yarn-based nickel-zinc textile battery may be constructed using scalably produced highly conductive yarns, such as stainless steel yarns, coated or covered with zinc (anodes) and nickel (cathode) materials, wherein the foregoing yarn anode and cathode components may be coated with an electrolyte to form yarn-based battery assemblies. A conductive yarn-based nickel-zinc textile battery may be constructed by weaving or knitting such yarn-based battery assemblies into a textile material, such as using industrial weaving or knitting machines, hand weaving or knitting processes, etc.

28 Claims, 10 Drawing Sheets

(51) Int. Cl.
| | |
|---|---|
| H01M 10/0565 | (2010.01) |
| H01M 10/04 | (2006.01) |
| H01M 2/02 | (2006.01) |
| H01M 4/02 | (2006.01) |
| H01M 4/52 | (2010.01) |
| D03D 1/00 | (2006.01) |
| D04B 1/22 | (2006.01) |

(52) U.S. Cl.
CPC .............. *H01M 2/026* (2013.01); *H01M 4/38* (2013.01); *H01M 4/523* (2013.01); *H01M 10/0436* (2013.01); *H01M 10/0565* (2013.01); *D10B 2401/16* (2013.01); *H01M 2004/022* (2013.01); *H01M 2300/0082* (2013.01); *H01M 2300/0085* (2013.01)

(56) References Cited

U.S. PATENT DOCUMENTS

| | | | |
|---|---|---|---|
| 8,663,844 B2 | 3/2014 | Kang et al. | |
| 8,940,434 B2 | 1/2015 | Khasanov et al. | |
| 9,620,770 B2 | 4/2017 | Takasaki et al. | |
| 2003/0068559 A1 | 4/2003 | Armstrong et al. | |
| 2003/0165744 A1 | 9/2003 | Schubert et al. | |
| 2005/0153208 A1 | 7/2005 | Konishiike et al. | |
| 2008/0008937 A1* | 1/2008 | Eylem ................ | H01M 2/16 429/218.1 |
| 2013/0130112 A1 | 5/2013 | Chung et al. | |
| 2013/0149580 A1* | 6/2013 | Kim ................ | H01M 4/78 429/94 |
| 2013/0244101 A1 | 9/2013 | Meckfessel Jones et al. | |
| 2014/0050990 A1 | 2/2014 | Yuan et al. | |
| 2014/0205909 A1 | 7/2014 | Yonehara et al. | |
| 2015/0372270 A1 | 12/2015 | Johns | |
| 2016/0301096 A1 | 10/2016 | Zhamu et al. | |
| 2017/0222272 A1 | 8/2017 | Takami et al. | |

FOREIGN PATENT DOCUMENTS

| | | |
|---|---|---|
| CN | 106340395 A | 1/2017 |
| EP | 1402593 A1 | 3/2004 |
| EP | 2455997 A1 | 5/2012 |
| KR | 20070009231 A * | 1/2007 |

OTHER PUBLICATIONS

Huang, Y. et al. "Weavable, Conductive Yarn-Based NiCo//Zn Textile Battery with High Energy Density and Rate Capability." ACS Nano, vol. 11, pp. 8953-8961, (2017), 9 pages.

Kim, H. et al. "Aqueous Rechargeable Li and Na Ion Batteries." Chem. Rev., vol. 114, pp. 11788-11827, (2014), 40 pages.

Zeng, Y. et al. "Flexible Ultrafast Aqueous Rechargeable Ni//Bi Battery Based on Highly Durable Single-Crystalline Bismuth Nano-Structured Anode." Adv. Mater, vol. 28, pp. 9188-9195, (2016), 8 pages.

Liu, J. L. et al. "A Flexible Alkaline Rechargeable Ni/Fe Battery Based on Graphene Foam/Carbon Nanotubes Hybrid Film." Nano Lett., vol. 14, pp. 7180-7187, (2014), 8 pages.

Pan, H. L. et al. "Reversible Aqueous Zinc/Manganese Oxide Energy Storage from Conversion Reactions." Nat. Energy, vol. 1, 16039, (2016), 7 pages.

Wang, G. J. et al. "An Aqueous Rechargeable Lithium Battery Based on Doping and Intercalation Mechanisms." J. Solid State Electrochem, vol. 14, pp. 865-869, (2010), 5 pages.

Lee, D. U. et al. "Self-Assembled NiO/Ni(OH)$_2$ Nanoflakes as Active Material for High-Power and High-Energy Hybrid Rechargeable Battery." Nano Lett., vol. 16, pp. 1794-1802, (2016), 9 pages.

Lee, J. H. et al. "Stabilized Octahedral Frameworks in Layered Double Hydroxides by Solid-Solution Mixing of Transition Metals." Adv. Funct. Mater., vol. 27, 1605225, (2017), 10 pages.

Yuan, C. Z. et al. "Ultrathin Mesoporous NiCo$_2$O$_4$ Nanosheets Supported on Ni Foam as Advanced Electrodes for Supercapacitors." Adv. Funct. Mater., vol. 22, pp. 4592-4597, (2012), 6 pages.

Xu, C. et al. "An Ultrafast, High Capacity and Superior Longevity Ni/Zn Battery Constructed on Nickel Nanowire Array Film." Nano Energy, vol. 30, pp. 900-908, (2016), 26 pages.

Huang, Y. et al. "From Industrially Weavable and Knittable Highly Conductive Yarns to Large Wearable Energy Storage Textiles." ACS Nano, vol. 9, pp. 4766-4775, (2015), 29 pages.

Huang, Y. et al. "Magnetic-Assisted, Self-Healable, Yarn-Based Supercapacitor." ACS Nano, vol. 9, pp. 6242-6251, (2015), 10 pages.

Jimenez, V. M. et al. "The State of the Oxygen at the Surface of Polycrystalline Cobalt Oxide." J. Electron Spectrosc. Relat. Phenom., vol. 71, pp. 61-71, (1995), 11 pages.

Li, Y .G. et al. "Recent Advances in Zinc-Air Batteries." Chem. Soc. Rev., vol. 43, pp. 5257-5275, (2014), 19 pages.

See, D. M. et al. "Temperature and Concentration Dependence of the Specific Conductivity of Concentrated Solutions of Potassium Hydroxide." J. Chem. Eng. Data, vol. 42, pp. 1266-1268, (1997), 3 pages.

Wang, X et al. "An Aqueous Rechargeable Zn//Co$_3$O$_4$ Battery with High Energy Density and Good Cycling Behavior." Adv. Mater., vol. 28, pp. 4904-4911, (2016), 8 pages.

Liu, J. P. et al. "A Flexible Quasi-Solid-State Nickel-Zinc Battery with High Energy and Power Densities Based on 3D Electrode Design." Adv. Mater., vol. 28, pp. 8732-8739, (2016), 8 pages.

Xu, J. et al. "Flexible Asymmetric Supercapacitors Based Upon Co$_9$S$_8$ Nanorod//Co$_3$O$_4$@RuO$_2$ Nanosheet Arrays on Carbon Cloth." ACS Nano, vol. 7, pp. 5453-5462, (2013), 10 pages.

Yu, D. S. et al. "Controlled Functionalization of Carbonaceous Fibers for Asymmetric Solid-State Micro-Supercapacitors with High Volumetric Energy Density." Adv. Mater., vol. 26, pp. 6790-6797, (2014), 8 pages.

Xia, C. et al. "Highly Stable Supercapacitors with Conducting Polymer Core-Shell Electrodes for Energy Storage Applications." Adv. Energy, Mater., vol. 5, 1401805, (2015), 9 pages.

Sun, J. F. et al. "Assembly and Electrochemical Properties of Novel Alkaline Rechargeable Ni/Bi Battery Using Ni(OH)$_2$ and (BiO)$_4$CO$_3$(OH)$_2$ Microspheres as Electrode Materials." J. Power Sources, vol. 274, pp. 1070-1075, (2015), 6 pages.

Yesibolati, N. et al. "High Performance Zn/LiFePO$_4$ Aqueous Rechargeable Battery for Large Scale Applications." Electrochim. Acta, vol. 152, pp. 505-511, (2015), 7 pages.

Liu, N. S. et al. "Cable-Type Supercapacitors of Three-Dimensional Cotton Thread Based Multi-Grade Nanostructures for Wearable Energy Storage." Adv. Mater., vol. 25, pp. 4925-4931, (2013), 7 pages.

Tao, J. Y. et al. "Solid-State High Performance Flexible Supercapacitors Based on Polypyrrole-MnO$_2$-Carbon Fiber Hybrid Structure." Sci. Rep., vol. 3, 2286, (2013), 7 pages.

Guan, C. et al. "High-Performance Flexible Solid-State Ni/Fe Battery Consisting of Metal Oxides Coated Carbon Cloth/Carbon Nanofiber Electrodes." Adv. Energy Mater., vol. 6, 1601034, (2016), 9 pages.

Yu, D. S. et al. "Scalable Synthesis of Hierarchically Structured Carbon Nanotube-Graphene Fibres for Capacitive Energy Storage." Nat. Nanotechnol., vol. 9, pp. 555-562, (2014), 9 pages.

Li, R. Z. et al. "Carbon-Stabilized High-Capacity Ferroferric Oxide Nanorod Array for Flexible Solid-State Alkaline Battery-Supercapacitor Hybrid Device with High Environmental Suitability." Adv. Funct. Mater., vol. 25, pp. 5384-5394, (2015), 11 pages.

Zhou, C. et al. "Construction of High-Capacitance 3D CoO@Polpyrrole Nanowire Array Electrode for Aqueous Asymmetric Supercapacitor." Nano Lett., vol. 13, pp. 2078-2085, (2013), 8 pages.

Lu, X. H. et al. "H—TiO$_2$@MnO$_2$//H—TiO$_2$@C Core-Shell Nanowires for High Performance and Flexible Asymmetric Super-Capacitors." Adv. Mater., vol. 25, pp. 267-272, (2013), 6 pages.

Yang, P .H. et al. "Low-Cost High-Performance Solid-State Asymmetric Supercapacitors Based on MnO$_2$ Nanowires and Fe$_2$O$_3$ Nanotubes." Nano Lett., vol. 14, pp. 731-736, (2014), 6 pages.

(56) References Cited

OTHER PUBLICATIONS

Zhu, C. R. et al. "All Metal Nitrides Solid-State Asymmetric Supercapacitors." Adv. Mater., vol. 27, pp. 4566-4571, (2015), 6 pages.

Yu, M. H. et al. "Holey Tungsten Oxynitride Nanowires: Novel Anodes Efficiently Integrate Microbial Chemical Energy Conversion and Electrochemical Energy Storage." Adv. Mater., vol. 27, pp. 3085-3091, (2015), 7 pages.

Zeng, Y. X. et al. "Advanced Ti-Doped $Fe_2O_3$@PEDOT Core/Shell Anode for High-Energy Asymmetric Super-Capacitors." Adv. Energy Mater., vol. 5, 1402176, (2015), 7 pages.

Lu, X. H. et al. "High Energy Density Asymmetric Quasi-Solid-State Supercapacitor Based on Porous Vanadium Nitride Nanowire Anode." Nano Lett., vol. 13, pp. 2628-2633, (2013), 6 pages.

Wang, X. F. et al. "Fiber-Based Flexible All-Solid-State Asymmetric Supercapacitors for Integrated Photodetecting System." Angew. Chem., Int. Ed., vol. 53, pp. 1849-1853, (2014), 5 pages.

Bae, J. et al. "Fiber Supercapacitors Made of Nanowire-Fiber Hybrid Structures for Wearable/Flexible Energy Storage." Angew. Chem. Int. Ed., vol. 50, pp. 1683-1687, (2011), 5 pages.

Chen, T. et al. "An Integrated "Energy Wire" for Both Photoelectric Conversion and Energy Storage." Angew. Chem., Int. Ed., vol. 51, pp. 11977-11980, (2012), 4 pages.

Pikul, J. H. et al. "High-Power Lithium Ion Microbatteries from Interdigitated Three-Dimensional Bicontinuous Nanoporous Electrodes." Nat. Commun., vol. 4, 1732, (2013), 5 pages.

Ren, J. et al. "Twisting Carbon Nanotube Fibers for Both Wire-Shaped Micro-Supercapacitor and Micro-Battery." Adv. Mater., vol. 25, pp. 1155-1159, (2013), 5 pages.

Wu, X. C. et al. "High-Performance Aqueous Battery with Double Hierarchical Nanoarrays." Nano Energy, vol. 10, pp. 229-234, (2014), 6 pages.

Sun, K. et al. "3D Printing of Interdigitated Li-Ion Microbattery Architectures." Adv. Mater., vol. 25, pp. 4539-4543, (2013), 5 pages.

Wang, H. L. et al. "An Ultrafast Nickel-Iron Battery from Strongly Coupled Inorganic Nanoparticle/Nanocarbon Hybrid Materials." Nat. Commun., vol. 3, 917, (2012), 8 pages.

Yoshima, K. et al. "Fabrication of Micro Lithium-Ion Battery with 3D Anode and 3D Cathode by Using Polymer Wall." J. Power Sources, vol. 208, pp. 404-408, (2012), 5 pages.

Gaikwad, A. M. et al. "Highly Flexible, Printed Alkaline Batteries Based on Mesh-Embedded Electrodes." Adv. Mater., vol. 23, pp. 3251-3255, (2011), 5 pages.

El-Kady, M. F. et al. "Laser Scribing of High-Performance and Flexible Graphene-Based Electrochemical Capacitors." Science, vol. 335, pp. 1326-1330, (2012), 5 pages.

Kou, L. et al. "Coaxial Wet-Spun Yarn Supercapacitors for High-Energy Density and Safe Wearable Electronics." Nat. Commun., vol. 5, 3754, (2014), 10 pages.

Yifan, X. et al. "An All-Solid-State Fiber-Shaped Aluminum-Air Battery with Flexibility, Stretchability, and High Electrochemical Performance." Angew, Chem. Int. Ed., vol. 55, pp. 7979-7982, (2016), 4 pages.

Zhang, Y. et al. "Advances in Wearable Fiber-Shaped Lithium-Ion Batteries." Adv. Mater., vol. 28, pp. 4524-4531, (2016), 8 pages.

Weng, W. et al. "Smart Electronic Textiles." Angew. Chem. Int. Ed., vol. 55, pp. 6140-6169, (2016), 30 pages.

Kim, D.-H. et al. "Silicon Electronics on Silk as a Path to Bioresorbable, Implantable Devices," Appl. Phys. Lett., 95, 133701, 2009, 3 pages.

Sun, H. et al. "Large-Area Supercapacitor Textiles with Novel Hierarchical Conducting Structures," Adv. Mater., vol. 28, No. 38, pp. 8431-8438, Oct. 2016, 8 pages.

Huang, Y. et al. "Robust Reduced Graphene Oxide Paper Fabricated With a Household Non-Stick Frying Pan: A Large-Area Freestanding Flexible Substrate for Supercapacitors," RSC Adv., vol. 5, No. 43, pp. 33981-33989, Mar. 2015, 9 pages.

Lu, X. et al. "Flexible Solid-State Supercapacitors: Design, Fabrication and Applications," Energy Environ. Sci., vol. 7, pp. 2160-2181, 2014, 22 pages.

Yu, D. et al. "Transforming Pristine Carbon Fiber Tows into High Performance Solid-State Fiber Supercapacitors," Adv. Mater., vol. 27, pp. 4895-4901, 2015, 7 pages.

Zhou, G. et al. "Progress in Flexible Lithium Batteries and Future Prospects," Energ. Environ. Sci., vol. 7, pp. 1307-1338, 2014, 32 pages.

Huang, Y. et al. "A Modularization Approach for Linear-Shaped Functional Supercapacitors," J. Mater. Chem. A, vol. 4, No. 12, pp. 4580-4586, Feb. 2016, 7 pages.

Sun, H. et al. "Energy Harvesting and Storage in 1D Devices," Nat. Rev. Mater., vol. 2, 17023, 2017, 12 pages.

Wang, X. et al. "Flexible Fiber Energy Storage and Integrated Devices: Recent Progress and Perspectives," Mater. Today, vol. 18, pp. 265-272, Jun. 2015, 8 pages.

Kwon, Y. H. et al. "Cable-Type Flexible Lithium Ion Battery Based on Hollow Multi-Helix Electrodes," Adv. Mater., vol. 24, pp. 5192-5197, 2012, 6 pages.

Hoshide, T. et al. "Flexible Lithium-Ion Fiber Battery by the Regular Stacking of Two-Dimensional Titanium Oxide Nanosheets Hybridized with Reduced Graphene Oxide," Nano Lett., vol. 17, No. 6, pp. 3543-3549, 2017, 7 pages.

Fang, X. et al. "A Cable-Shaped Lithium Sulfur Battery," Adv. Mater., vol. 28 (3), pp. 491-496, 2016, 6 pages.

Choi, C. et al. "Improvement of System Capacitance Via Weavable Superelastic Biscrolled Yarn Supercapacitors," Nat. Commun., vol. 7, 13811, 2016, 8 pages.

Shen, Y. W. et al. "The Mechanism of Capacity Fade of Rechargeable Alkaline Manganese Dioxide Zinc Cells," J. Power Sources, vol. 87, pp. 162-166, 2000, 5 pages.

Yu, X. et al. "Flexible Fiber-Type Zinc-Carbon Battery Based on Carbon Fiber Electrodes," Nano Energy, vol. 2, No. 6, pp. 1242-1248, 2013, 7 pages.

Wang, Z.et al. "Fabrication of High-Performance Flexible Alkaline Batteries by Implementing Multiwalled Carbon Nanotubes and Copolymer Separator," Adv. Mater., vol. 26, pp. 970-976, 2014, 7 pages.

Xu, C. et al. "Energetic Zinc Ion Chemistry: The Rechargeable Zinc Ion Battery," Angew. Chem. Int. Ed., vol. 51, pp. 933-935, 2012, 3 pages.

Lee, B. et al. "Electrochemically-Induced Reversible Transition from the Tunneled to Layered Polymorphs of Manganese Dioxide," Sci. Rep., vol. 4, pp. 6066-6074, 2014, 8 pages.

Alfaruqi, M. H. et al. "A Layered $\delta$-$MnO_2$ Nanoflake Cathode with High Zinc-Storage Capacities for Eco-Friendly Battery Applications," Electrochem. Commun., vol. 60, pp. 121-125, 2015, 5 pages.

Huang, Y. et al. "A Polyacrylamide Hydrogel Electrolyte Enabled Intrinsically 1000% Stretchable and 50% Compressible Supercapacitor," Angew. Chem. Int. Ed., vol. 129, 2017, 7 pages.

Choudhury, N. A. et al. "Hydrogel-Polymer Electrolytes for Electrochemical Capacitors: An Overview," Energy Environ. Sci., vol. 2 (1), pp. 55-67, 2009, 13 pages.

Yang, F. et al. "Synthesis, Characterization, and Applied Properties of Carboxymethyl Cellulose and Polyacrylamide Graft Copolymer," Carbohyd. Polym., vol. 78, pp. 95-99, 2009, 5 pages.

Hu, X. et al. "Synthesis and Characterization of a Novel Hydrogel: Salecan/Polyacrylamide Semi-IPN Hydrogel with a Desirable Pore Structure," J. Mater. Chem. B, vol. 2, pp. 3646-3658, 2014, 13 pages.

Ghosh, P. et al. "Studies on Stable Aqueous Polyaniline Prepared with the Use of Polyacrylamide as the Water Soluble Support Polymer," Eur. Polym. J., vol. 35, pp. 803-813, 1999, 11 pages.

Biswal, D. R. et al. "Flocculation Studies Based on Water-Soluble Polymers of Grafted Carboxymethyl Cellulose and Polyacrylamide," J. Appl. Polym. Sci., vol. 102, pp. 1000-1007, 2006, 8 pages.

Biswal, D. R. et al. "Characterisation of Carboxymethyl Cellulose and Polyacrylamide Graft Copolymer," Carbohyd. Polym., vol. 57, pp. 379-387, 2004, 9 pages.

Pech, D. et al. "Ultrahigh-Power Micrometre-Sized Supercapacitors Based on Onion-Like Carbon," Nat. Nanotechnol., vol. 5, pp. 651-654, 2010, 4 pages.

(56) References Cited

OTHER PUBLICATIONS

Yang, Y. et al. "Waterproof, Ultrahigh Areal-Capacitance, Wearable Supercapacitor Fabrics," Adv. Mater., vol. 29, 1606679, 2017, 9 pages.
Deng, J. et al. "A Shape-Memory Supercapacitor Fiber," Angew. Chem. Int. Ed., vol. 54, pp. 15419-15423, 2015, 5 pages.
You, J. et al. "A Polymer Tandem Solar Cell with 10.6% Power Conversion Efficiency," Nat. Commun., vol. 4, 1446, 2013, 10 pages.
Liu, W. et al. "Solar-Induced Direct Biomass-to-Electricity Hybrid Fuel Cell Using Polyoxometalates as Photocatalyst and Charge Carrier," Nat. Commun., vol. 5, 3208, 2014, 8 pages.
Snyder, G. J. et al. "Complex Thermoelectric Materials," Nat. Mater., vol. 7, pp. 105-114, 2008, 10 pages.
Sun, Y. et al. "Promises and Challenges of Nanomaterials for Lithium-Based Rechargeable Batteries," Nature Energy, vol. 1, 16071, 2016, 12 pages.
Ji, L. et al. "Recent Developments in Nanostructured Anode Materials for Rechargeable Lithium-Ion Batteries," Energy Environ. Sci., vol. 4, pp. 2682-2699, 2011, 18 pages.
Kim, S.-W. et al. "Electrode Materials for Rechargeable Sodium-Ion Batteries: Potential Alternatives to Current Lithium-Ion Batteries," Adv. Energy Mater., vol. 2, pp. 710-721, 2012, 12 pages.
Goodenough, J. B. et al "The Li-Ion Rechargeable Battery: A Perspective," J. Am. Chem. Soc., vol. 135, pp. 1167-1176, 2013, 10 pages.
Liu, B. et al. "Hierarchical Three-Dimensional $ZnCo_2O_4$ Nanowire Arrays/Carbon Cloth Anodes for a Novel Class of High-Performance Flexible Lithium-Ion Batteries," Nano Lett., vol. 12, pp. 3005-3011, 2012, 7 pages.
Koo, M. et al "Bendable Inorganic Thin-Film Battery for Fully Flexible Electronic Systems," Nano Lett., vol. 12, pp. 4810-4816, 2012, 7 pages.
Wang, C. et al. "Functionalized Polythiophene-Coated Textile: A New Anode Material for a Flexible Battery," J. Power Sources, vol. 156, pp. 610-614, 2006, 5 pages.
Liu, W. et al. "3D Porous Sponge-Inspired Electrode for Stretchable Lithium-Ion Batteries," Adv. Mater., vol. 28, pp. 3578-3583, 2016, 6 pages.
Huang, Y. et al. "A Self-Healable and Highly Stretchable Supercapacitor Based on a Dual Crosslinked Polyelectrolyte," Nat. Comm., vol. 6, 10310, 2015, 8 pages.
Frenzel, J. et al. "Influence of Ni on Martensitic Phase Transformations in NiTi Shape Memory Alloys," Acta Materialia, vol. 58, pp. 3444-3458, 2010, 15 pages.
Nespoli, A. et al. "The High Potential of Shape Memory Alloys in Developing Miniature Mechanical Devices: A Review on Shape Memory Alloy Mini-Actuators," Sensors and Actuators A: Physical, vol. 158, pp. 149-160, 2010, 12 pages.
Jung, H. et al. "Nanosize Si Anode Embedded in Super-Elastic Nitinol (Ni-Ti) Shape Memory Alloy Matrix for Li Rechargeable Batteries," J. Mater. Chem., vol. 21, pp. 11213-11216, 2011, 4 pages.
Huang, Y. et al. "A Shape Memory Supercapacitor and its Application in Smart Energy Storage Textiles," J. Mater. Chem. A, vol. 4, pp. 1290-1297, 2016, 8 pages.
Li, Y.-Q. et al. "Remarkable Improvements in Volumetric Energy and Power of 3D $MnO_2$ Microsupercapacitors by Tuning Crystallographic Structures," Adv. Funct. Mater., vol. 26, pp. 1830-1839, 2016, 10 pages.
Zhu, M. et al. "Highly Flexible, Freestanding Supercapacitor Electrode with Enhanced Performance Obtained by Hybridizing Polypyrrole Chains with MXene," Adv.Energy Mater., vol. 6, 1600969, 2016, 9 pages.
Huang, Y. et al. "Extremely Stable Polypyrrole Achieved Via Molecular Ordering for Highly Flexible Supercapacitors," ACS Appl. Mater. and Interfaces, vol. 8, pp. 2435-2440, 2016, 6 pages.

Huang, Y. et al. "Enhanced Tolerance to Stretch-Induced Performance Degradation of Stretchable $MnO_2$-Based Supercapacitors," ACS Appl. Mater. and Interfaces, vol. 7, pp. 2569-2574, 2015, 6 pages.
Li, M. et al. "Polypyrrole Nanofiber Arrays Synthesized by a Biphasic Electrochemical Strategy," J. Mater. Chem., vol. 18, pp. 2276-2280, 2008, 5 pages.
Xie, Y. et al. "Electrochemical Capacitance of a Carbon Quantum Dots-Polypyrrole/Titania Nanotube Hybrid," RSC Adv., vol. 5, pp. 89689-89697, 2015, 9 pages.
Kuang, P.-Y. et al. "Anion-assisted One-Pot Synthesis of 1D Magnetic $\alpha$- and $\beta$-$MnO_2$ Nanostructures for Recyclable Water Treatment Application," New J. Chem., vol. 39, pp. 2497-2505, 2015, 9 pages.
Cai, G. et al. "Extremely Stretchable Strain Sensors Based on Conductive Self-Healing Dynamic Cross-Links Hydrogels for Human-Motion Detection," Adv. Sci., 4, 1600190, 2017, 7 pages.
Spoljaric, S. "Stable, Self-healing Hydrogels from Nanofibrillated Cellulose, Poly(Vinyl Alcohol) and Borax Via Reversible Crosslinking," Eur. Polym. J., vol. 56, pp. 105-117, 2014, 41 pages.
Wang, H. et al. "Alternative Multifunctional Cyclic Organosilicon as an Efficient Electrolyte Additive for High Performance Lithium-Ion Batteries." Electrochim. Acta, vol. 254, pp. 112-122, (2017), 11 pages.
Zhang, S.S. "A Review on Electrolyte Additives for Lithium-Ion Batteries." J. Power Sources, vol. 162, pp. 1379-1394, (2006), 16 pages.
Arthur, T. S. et al. "Three-Dimensional Electrodes and Battery Architectures." MRS Bull. vol. 36, pp. 523-531, (2011), 9 pages.
Liu, L. et al. "Advances on Microsized On-Chip Lithium-Ion Batteries." Small, vol. 13. 1701847, (2017), 12 pages.
Zhu, M. S. et al. "Capacitance Enhancement in a Semiconductor Nanostructure-Based Supercapacitor by Solar Light and a Self-Powered Supercapacitor Photodetector System." Adv. Funct. Mater., vol. 26, pp. 4481-4490, (2016), 10 pages.
Zhu, M. S. et al. "An Electrochromic Supercapacitor and its Hybrid Derivatives: Quantifiably Determining Their Electrical Energy Storage by an Optical Measurement." J. Mater. Chem. A, vol. 3, pp. 21321-21327, (2015), 7 pages.
Zhang, P. P. et al. "Stimulus-Responsive Micro-Supercapacitors with Ultrahigh Energy Density and Reversible Electrochromic Window." Adv. Mater., vol. 29, 1604491 (2017), 7 pages.
Manthiram, A. "An Outlook on Lithium Ion Battery Technology." ACS Central Sci., vol. 3, pp. 1063-1069, (2017), 7 pages.
Sun, W. et al. "Zn/$MnO_2$ Battery Chemistry With $H^+$ and $Zn^{2+}$ Coinsertion." J. Am. Chem. Soc., vol. 139, pp. 9775-9778, (2017), 4 pages.
Zhang, N. et al. "Rechargeable Aqueous Zinc-Manganese Dioxide Batteries with High Energy and Power Densities." Nat. Commun., vol. 8, 405, (2017), 9 pages.
Zhang, N. et al. "Cation-Deficient Spinel $ZnMn_2O_4$ Cathode in $Zn(CF_3SO_3)_2$ Electrolyte for Rechargeable Aqueous Zn-Ion Battery." J. Am. Chem. Soc., vol. 138, pp. 12894-12901, (2016), 8 pages.
Kundu, D. et al. "A High-Capacity and Long-Life Aqueous Rechargeable Zinc Battery Using a Metal Oxide Intercalation Cathode." Nat. Energy, vol. 1, 16119 (2016), 7 pages.
Suo, L. M. et al. ""Water-in-Salt" Electrolyte Makes Aqueous Sodium-Ion Battery Safe, Green, and Long-Lasting." Adv. Energy Mater., vol. 7, 1701189, (2017), 10 pages.
Yang, C. Y. et al. "Flexible Aqueous Li-Ion Battery with High Energy and Power Densities." Adv. Mater., vol. 29, 1701972 (2017), 8 pages.
Yamada, Y. et al. "Hydrate-Melt Electrolytes for High-Energy-Density Aqueous Batteries." Nat. Energy, vol. 1, 16129, (2016), 9 pages.
Suo, L. M. et al. ""Water-in-Salt" Electrolyte Enables High-Voltage Aqueous Lithium-Ion Chemistries." Science, vol. 350, pp. 938-943, (2015), 6 pages.
Boles, M. A. et al. "Self-Assembly of Colloidal Nanocrystals: From Intricate Structures to Functional Materials." Chem. Rev., vol. 116, pp. 11220-11289 (2016), 70 pages.

(56) References Cited

OTHER PUBLICATIONS

Talapin, D. V. et al. "Prospects of Colloidal Nanocrystals for Electronic and Optoelectronic Applications." Chem. Rev., vol. 110, pp. 389-458, (2010), 70 pages.
Gaponik, N. et al. "Thiol-capping of CdTe Nanocrystals: An Alternative to Organometallic Synthetic Routes." J. Phys. Chem. B, vol. 106, pp. 7177-7185,(2002), 9 pages.
Rogach, A. L. et al. "Aqueous Synthesis of Thiol-Capped CdTe Nanocrystals: State-of-the-Art." J. Phys. Chem. C, vol. 111, 14628-14637, (2007), 10 pages.
Kim, J. Y. et al. "25th Anniversary Article: Colloidal Quantum Dot Materials and Devices: A Quarter-Century of Advances." Adv. Mater., vol. 25, pp. 4986-5010 (2013), 25 pages.
Palui, G. et al. "Strategies for Interfacing Inorganic Nanocrystals With Biological Systems Based on Polymer-Coating." Chem. Soc. Rev., vol. 44, pp. 193-227, (2015), 35 pages.
Tang, Q. W. et al. Effect of Surface Manganese Valence of Manganese Oxides on the Activity of the Oxygen Reduction Reaction in Alkaline Media. ACS Catal., vol. 4, pp. 457-463 (2014), 7 pages.
Song, Y. et al. "Pushing the Cycling Stability Limit of Polypyrrole for Supercapacitors." Adv. Funct. Mater., vol. 25, pp. 4626-4632, (2015), 7 pages.
Yuan, X. X. et al. "Improved Performance of Proton Exchange Membrane Fuel Cells with p-Toluenesulfonic Acid-Doped Co-PPy/C as Cathode Electrocatalyst." J. Am. Chem. Soc., vol. 132, pp. 1754-1755, (2010), 2 pages.
Adam, M. et al. "Implementation of High-Quality Warm-White Light-Emitting Diodes by a Model-Experimental Feedback Approach Using Quantum Dot-Salt Mixed Crystals." ACS Appl. Mater. Interfaces, vol. 7, pp. 23364-23371, (2015), 8 pages.
Adam, M. et al. "Colloidal Nanocrystals Embedded in Macrocrystals: Methods and Applications." J. Phys. Chem. Lett., pp. 4117-4123, (2016), 7 pages.
Otto, T. et al. "Colloidal Nanocrystals Embedded in Macrocrystals: Robustness,Photostability, and Color Purity." Nano Lett., vol. 12, pp. 5348-5354, (2012), 7 pages.
Zhang, F. et al. "Brightly Luminescent and Color-Tunable Colloidal $CH_3NH_3PbX_3$ (X =Br, I, Cl) Quantum Dots: Potential Alternatives for Display Technology." ACS Nano, vol. 9, pp. 4533-4542, (2015), 10 pages.
Wang, X. Y. et al. "Surface-Related Emission in Highly Luminescent CdSe Quantum Dots." Nano Lett., vol. 3, pp. 1103-1106, (2003), 4 pages.
Lu, Y. Y. et al. "Stable Cycling of Lithium Metal Batteries Using High Transference Number Electrolytes." Adv. Energy Mater., vol. 5, 1402073 (2015), 7 pages.
Liu, W. et al. "Enhancing Ionic Conductivity in Composite Polymer Electrolytes with Well-Aligned Ceramic Nanowires." Nat. Energy, vol. 2, 17035 (2017), 7 pages.
Hayes, A. C. et al. "Raman Spectroscopic Study of Aqueous $(NH_4)_2SO_4$ and $ZnSO_4$ Solutions." J. Solution Chem., vol. 13, pp. 61-75, (1984), 15 pages.
Liu, W. et al. "Improved Lithium Ionic Conductivity in Composite Polymer Electrolytes with Oxide-Ion Conducting Nanowires." ACS Nano, vol. 10, pp. 11407-11413, (2016), 7 pages.
Wu, Z.-S. et al. "Graphene-Based In-Plane Micro-Supercapacitors with High Power and Energy Densities." Nat. Commun.,vol. 4, 2487 (2013), 8 pages.
El-Kady, M. F. et al. "Scalable Fabrication of High-Power Graphene Micro-Supercapacitors for Flexible and On-Chip Energy Storage." Nat. Commun., vol. 4, 1475 (2013), 9 pages.
Li, L. et al. "High-Performance Pseudocapacitive Microsupercapacitors from Laser-Induced Graphene." Adv. Mater., vol. 28, pp. 838-845, (2016), 8 pages.
Ning, H. L. et al. "Holographic Patterning of High-Performance On-Chip 3D Lithium-Ion Microbatteries." P. Natl. Acad. Sci. USA, vol. 112, pp. 6573-6578, (2015), 6 pages.
Yu, W. W. et al. "Experimental Determination of the Extinction Coefficient of CdTe, CdSe, and CdS Nanocrystals." Chem. Mater., vol. 15, pp. 2854-2860, (2003), 7 pages.
Song, Y. et al. "Electrochemical Anchoring of Dual Doping Polypyrrole on Graphene Sheets Partially Exfoliated From Graphite Foil for High-Performance Supercapacitor Electrode." J. Power Sources, vol. 249, pp. 48-58, (2014), 11 pages.
Zeng, Y. et al. "Achieving Ultrahigh Energy Density and Long Durability in a Flexible Rechargeable Quasi-Solid-State Zn—$Mno_2$ Battery" Adv. Mater. vol. 29. 2017, 7 pages.
Alfaruqi, M. H. et al. "Electrochemically Induced Structural Transformation in a γ-$MnO_2$ Cathode of a High Capacity Zinc-Ion Battery System," Chem. Mater., vol. 27, pp. 3609-3620, 2015, 12 pages.

* cited by examiner

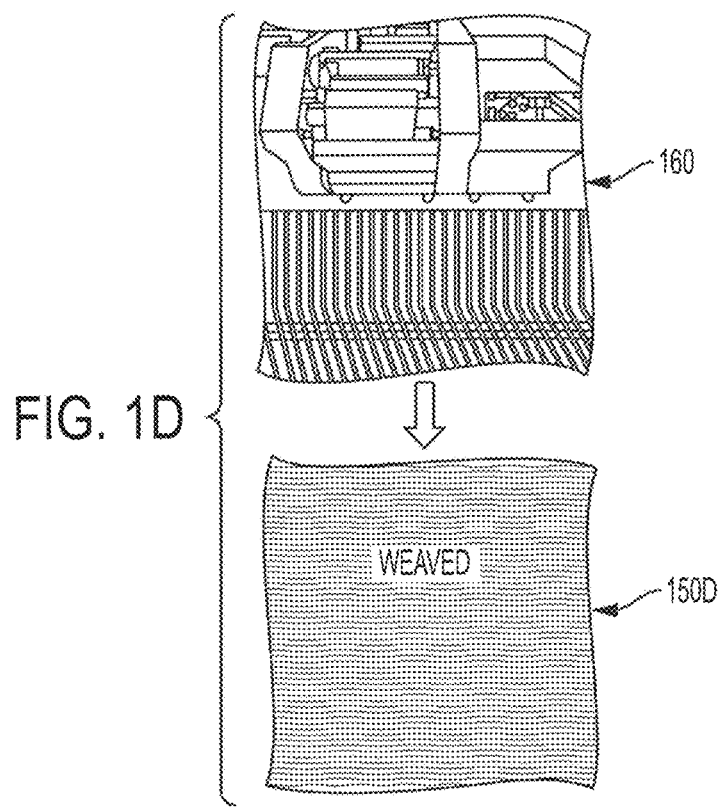
FIG. 1D
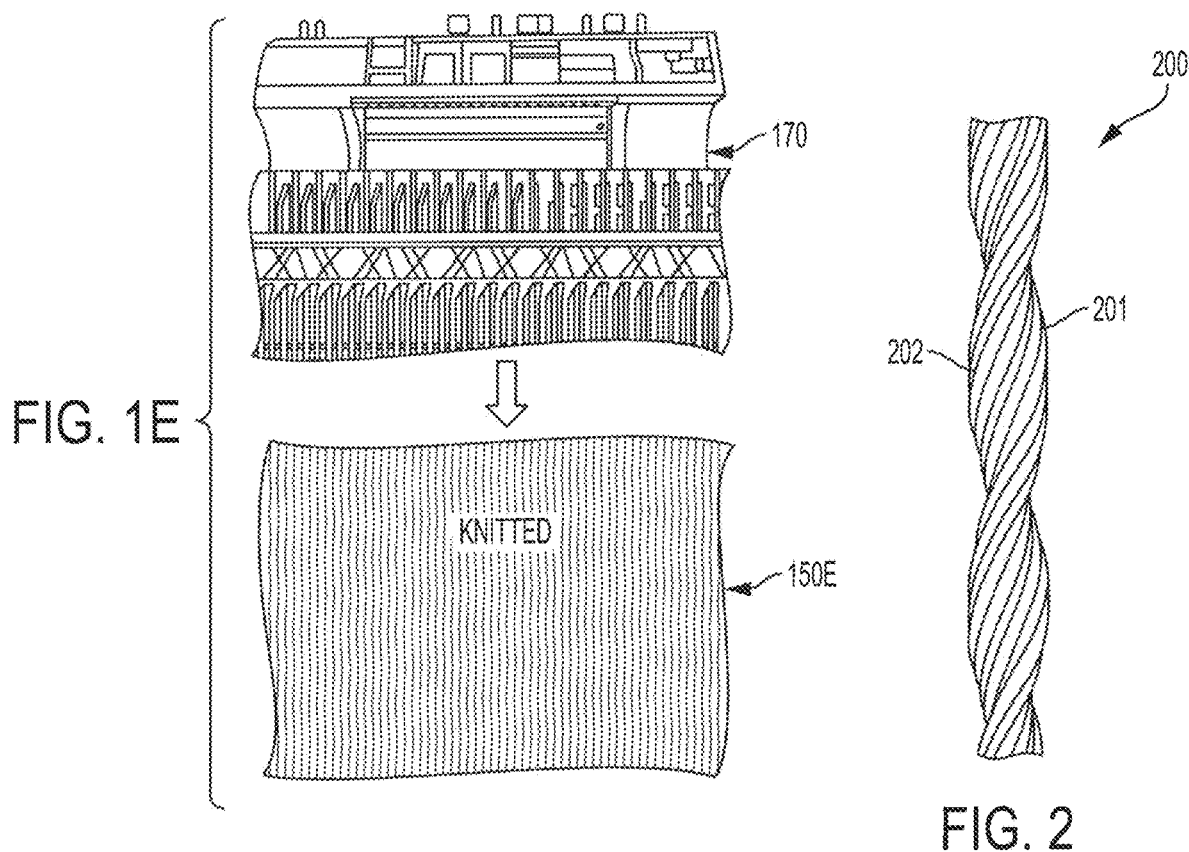
FIG. 1E
FIG. 2

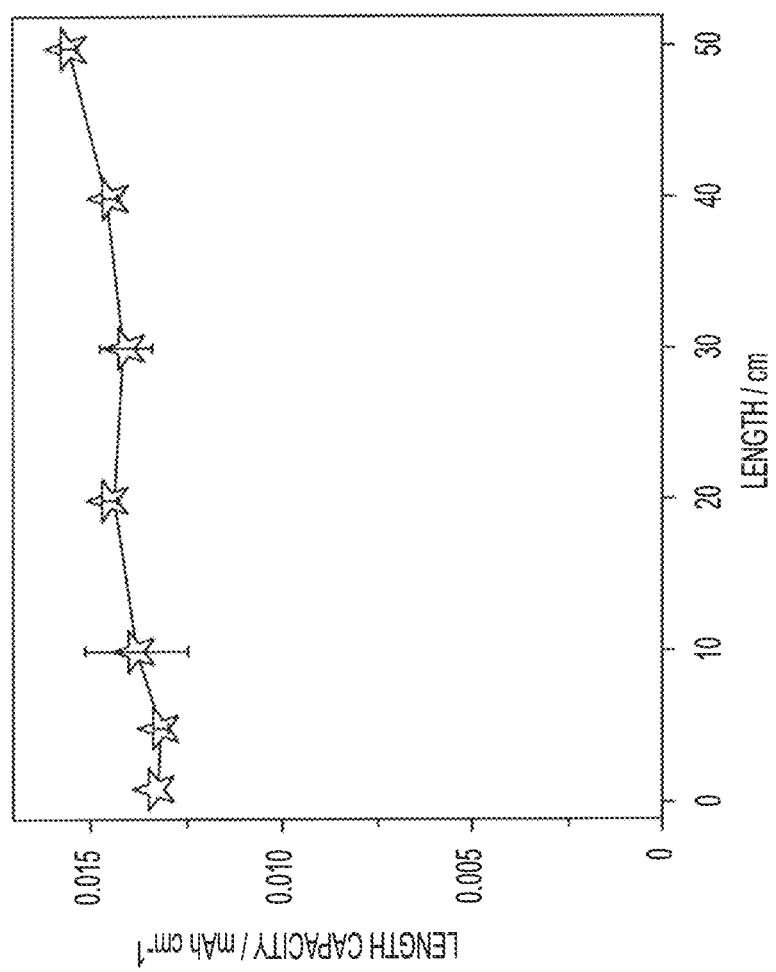

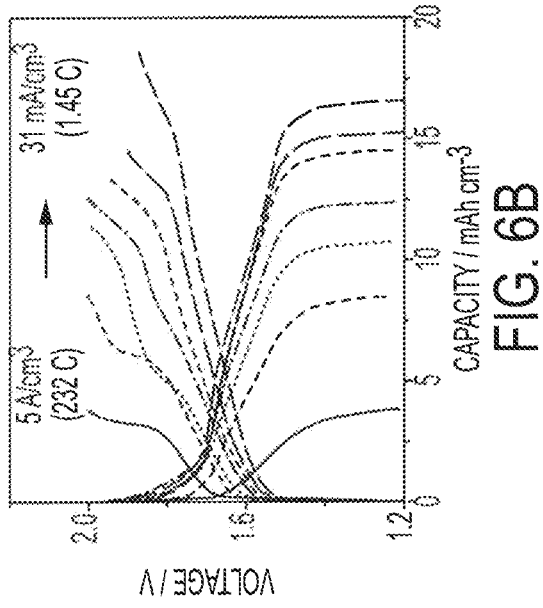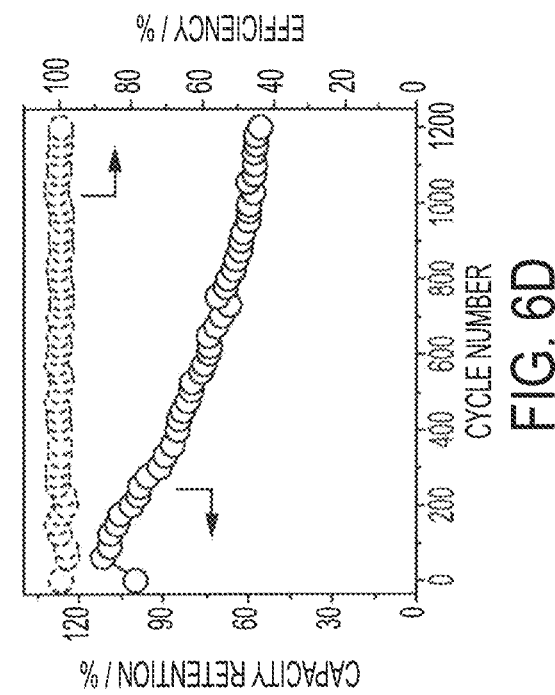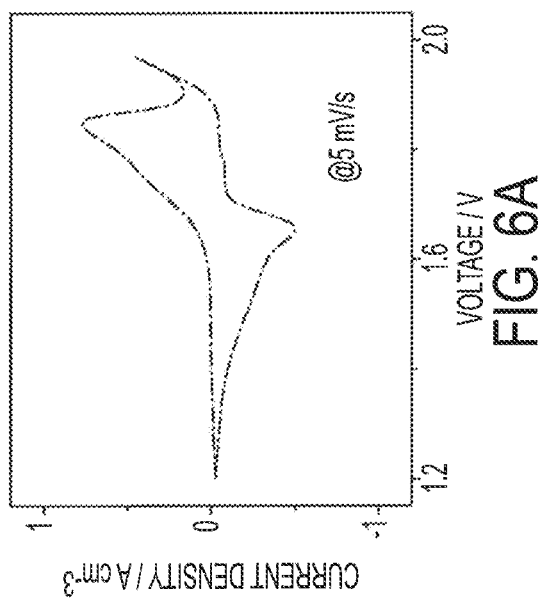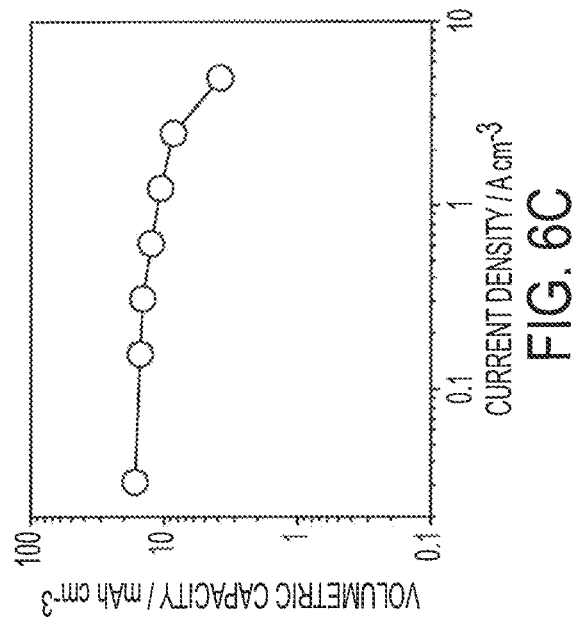
FIG. 6A
FIG. 6B
FIG. 6C
FIG. 6D

CONDUCTIVE YARN-BASED NICKEL-ZINC TEXTILE BATTERIES

CROSS-REFERENCE TO RELATED APPLICATIONS

The present application is related to co-pending and commonly assigned U.S. patent applications Ser. No. 15/805,779 entitled "RECHARGEABLE POLYACRYLAMIDE BASED POLYMER ELECTROLYTE ZINC ION BATTERIES" filed Nov. 7, 2017, and Ser. No. 15/805,817 entitled "RECHARGEABLE ZINC-ION BATTERIES HAVING FLEXIBLE SHAPE MEMORY" filed Nov. 7, 2017, the disclosures of which are hereby incorporated herein by reference.

TECHNICAL FIELD

The present invention relates generally to energy-storage devices and, more particularly, to conductive yarn-based nickel-zinc textile batteries formed using yarn-based anodes and cathodes configured to facilitate textile material processing, such as weaving, knitting, etc.

BACKGROUND OF THE INVENTION

Flexible or wearable electronics are leading the trend of next-generation consumer electronic products and they are finding more applications in sportswear, pressure sensors, military uniforms, and implantable medical devices. Emerging research toward such next-generation flexible and wearable electronics has stimulated efforts to build highly flexible, durable and deformable energy-storage devices. For example, the development of flexible electronics demands highly flexible energy storage devices, which not only have high energy/power density and rate performance similar to conventional power sources but also possess robust mechanical properties. However, a key challenge is presented in how to fabricate highly deformable, durable, and wearable energy-storage devices with excellent electrochemical performance and shape versatility for powering such next-generation electronic products.

Wearable aqueous rechargeable batteries have received increasing attention for personalized electronics due to their intrinsic safety and low cost. Nickel-zinc (Ni—Zn) fiber or yarn-based batteries are promising because of their high output voltage ($\approx 1.8$ V) compared to that of other aqueous batteries (most $\leq 1.2$ V) and their similarity with traditional textiles. However, no work has been reported regarding Zn-based yarn batteries which can accommodate industrial textile material processing, such as industrial weaving and knitting processes used to form various textile materials. For example, high-performance wearable batteries which accommodate industrial textile material processing impose considerable requirements for yarn electrodes, including high electric conductivity and high mechanical strength. In particular, the much higher capacity of batteries compared with that of supercapacitors and the long-distance one-dimensional electronic transportation in the yarn raise a much more critical requirement on the conductivity of yarns. Moreover, a tensile stress at a magnitude of hundreds of MPa (i.e., force per unit area), which exponentially increases at the contact region of yarns and metallic parts because of friction, is imposed on the yarn from industrial weaving and knitting machines, thus presenting significant demands on the strength and mechanical integrity of the yarns.

BRIEF SUMMARY OF THE INVENTION

The present invention is directed to systems and methods which provide nickel-zinc textile batteries formed from highly conductive yarn-based components which are configured to facilitate textile material processing, such as weaving, knitting, etc. Embodiments of a conductive yarn-based nickel-zinc textile battery of the present invention may, for example, be constructed using scalably produced highly conductive yarns coated or covered with zinc (anodes) and nickel (cathode) materials, wherein the foregoing yarn anode and cathode components may be coated with an electrolyte to form yarn-based battery assemblies. A conductive yarn-based nickel-zinc textile battery may be constructed by weaving or knitting such yarn-based battery assemblies into a textile material, such as using industrial weaving or knitting machines, hand weaving or knitting processes, etc. For example, fabric pieces comprised of conductive cloth having one or more conductive yarn-based nickel-zinc textile battery woven or knitted therein as the a part of the woven or knitted media are provided in sufficient dimensions to enable fabrication of one or more human wearable items therefrom according to embodiments. Accordingly, conductive yarn-based nickel-zinc textile batteries of embodiments may, for example, serve as a flexible textile-like electric power supply for wearable electronic applications (e.g., smart bands, performance monitors, medical sensors, asset tracking, and the like), standby and/or mobile use (e.g., standby or mobile power supply for communications devices, computing devices, timepieces, sensors, monitors, and the like), etc.

Highly conductive yarn-based components configured to facilitate textile material processing utilized in constructing conductive yarn-based nickel-zinc textile batteries of embodiments may, for example, comprise stainless steel yarns. Stainless steel utilized in conductive yarns according to embodiments of the invention is, for example, generally readily available, relatively inexpensive, provides good conductivity, and excellent mechanical strength. Stainless steel yarns utilized according to embodiments provide both high electric conductivity and high mechanical strength, and thus are excellent yarn current collectors for implementing high-performance textile batteries in accordance with the concepts of the present invention.

Various implementations of nickel-zinc battery configurations, such as nickel/cobalt-zinc battery implementations, generally provide intrinsic safety and may enable higher energy densities than supercapacitors. Accordingly, embodiments of conductive yarn-based nickel-zinc textile batteries herein are produced using the aforementioned stainless steel yarns uniformly covered with zinc nanoflakes to provide anodes and nickel cobalt hydroxide nanosheets to provide cathodes. An alkali gel electrolyte may be utilized with respect to the foregoing anode and cathode components to form yarn-based battery assemblies used in constructing conductive yarn-based nickel-zinc textile batteries of embodiments of the invention.

Conductive yarn-based nickel-zinc textile batteries of embodiments provide excellent battery level capacity, energy density, and rate capabilities in addition to exhibiting supercapacitor level power density. For example, conductive yarn-based nickel-zinc textile batteries of exemplary embodiments provide relatively high output voltage (e.g., $\approx 1.8$ V) compared to that of other aqueous batteries (e.g., most $\leq 1.2$ V), Further, exemplary conductive yarn-based nickel-zinc textile batteries constructed in accordance with the concepts herein have been found to deliver high specific capacity of 5 mAh cm$^{-3}$ and energy densities of 0.12 mWh cm$^{-2}$ and 8 mWh cm$^{-3}$ (based on the whole solid battery). The exemplary conductive yarn-based nickel-zinc textile batteries further exhibited ultrahigh rate capabilities of 232 C (liquid electrolyte) and 116 C (solid electrolyte), which endows the batteries excellent power densities of 32.8 mW cm$^{-2}$ and 2.2 W cm$^{-3}$ (based on the whole solid battery). In addition to the foregoing excellent performance characteristics, conductive yarn-based nickel-zinc textile batteries of embodiments present a form which is very similar to traditional textiles (e.g., in regards to tactile feel, ductility, etc.). Accordingly, it can be appreciated that conductive yarn-based nickel-zinc textile batteries of embodiments of the present invention are well suited to power various electronic devices, providing both wearability and energy storage, and thus facilitating connecting the textile industry with personalized wearable electronics and healthcare.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 1A-1E show conductive yarn-based nickel-zinc textile batteries, and components thereof, in accordance with embodiments of the present invention;

FIG. 2 shows a conductive yarn as may be formed from stainless steel continuously spun to ultrathin filaments and the resulting filaments twisted into a yarn in accordance with embodiments of the present invention;

FIG. 3 shows length capacity with respect to a length of yarn electrode of a yarn-based battery assembly of embodiments of the present invention;

FIGS. 6A-6D show electrochemical performance characteristics of exemplary yarn-based battery assemblies comprising a liquid electrolyte in accordance with embodiments of the present invention;

DETAILED DESCRIPTION OF THE INVENTION

Figure 1A:
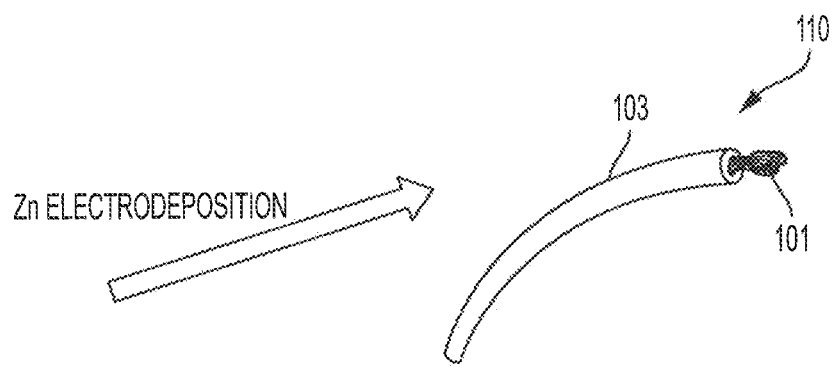

FIGS. 1A-1E show conductive yarn-based nickel-zinc textile batteries, and components thereof, formed from highly conductive yarn-based components which are configured to facilitate textile material processing in accordance with embodiments of the invention. In particular, FIG. 1D shows conductive yarn-based nickel-zinc textile battery 150D formed using industrial weaving machine 160 while FIG. 1E shows conductive yarn-based nickel-zinc textile battery 150E formed using industrial knitting machine 170.

Figure 1B:
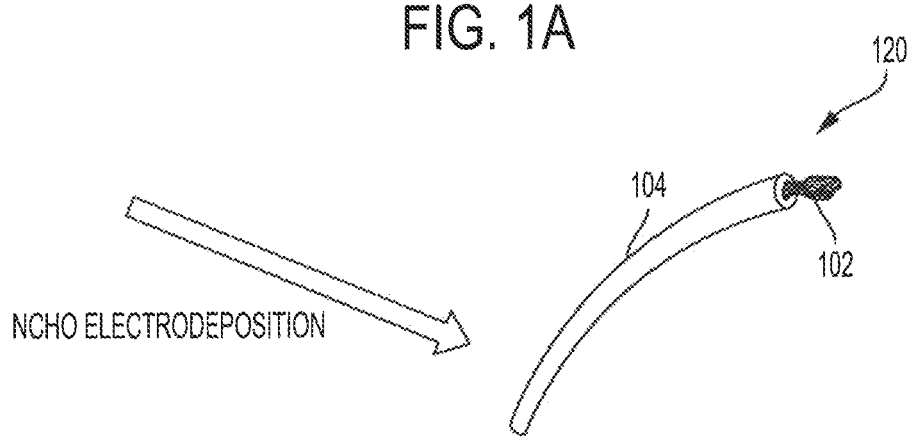
Figure 1C:
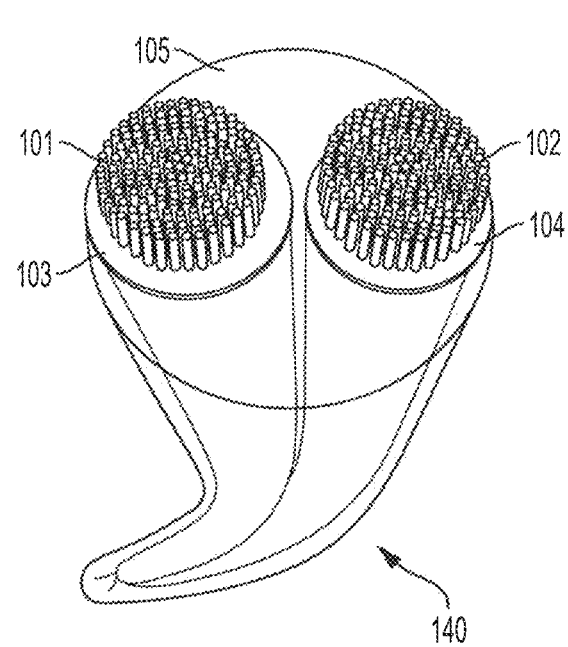

Conductive yarn-based nickel-zinc textile batteries 150D and 150E are preferably constructed using scalably produced highly conductive yarns, shown as yarn electrodes 101 and 102 in FIGS. 1A-1C. Certain metals may, for example, provide excellent conductivity and strength. It has been determined that stainless steel 316L can be spun at high temperature to form micron-sized filaments, wherein a twist-bundle-drawing technique may be utilized to continuously produce (i.e., deliver large-scale-yield) conductive yarns providing flexibility similar to cotton yarns. Such stainless steel yarns may be utilized according to embodiments of the invention to provide both high electric conductivity and high mechanical strength with respect to a conductive yarn-based nickel-zinc textile battery implementation. Accordingly, stainless steel yarns may be utilized according to embodiments in forming yarn electrodes 101 and 102 providing highly conductive yarn-based components configured to facilitate textile material processing utilized in constructing conductive yarn-based nickel-zinc textile batteries 150D and 150E facilitating weavability, knittability, and wearability.

It should be appreciated that, although embodiments are described herein with respect to stainless steel yarns, other materials may be utilized in providing yarns having suitable mechanical strength and high conductivity in accordance with other embodiments. For example, yarns formed using other types of materials, such as carbon nanotubes (CNTs) yarns, may provide excellent conductivity. Yarns formed using copper, nickel filaments may provide suitable current collectors according to embodiments. Yarns of one or more such materials may be utilized in conductive yarn-based nickel-zinc textile batteries of embodiments herein (e.g., the yarns of the anode and cathode of a conductive yarn-based nickel-zinc textile battery may each be made of the same one or more materials, the yarn of the anode and cathode may each be made of one or more different one or more materials, etc.).

Conductive yarn-based components (e.g., anodes and cathodes) utilized in constructing conductive yarn-based nickel-zinc textile batteries of embodiments may be provided by coating or covering the aforementioned conductive yarn of yarn electrodes 101 and 102 with zinc (anodes) and nickel (cathode) materials. Anode 110 of FIGS. 1A and 1C may, for example, be fabricated by electrodeposition of zinc (Zn) to provide a uniform coating of Zn (shown as active layer 103 in FIG. 1A) upon yarn electrode 101. Similarly, cathode 120 of FIGS. 1B and 1C may be fabricated by electrodeposition of nickel cobalt hydroxide (NCHO) to provide a uniform coating of NCHO (shown as active layer 104 in FIG. 1B) upon yarn electrode 102. The foregoing electrodeposition of active layers 103 and 104 may be provided using various electrodeposition techniques, such as three-electrode mode electrodeposition, roll-electrodeposition etc. It should be appreciated that conductive yarn-based components utilized in constructing conductive yarn-based nickel-zinc textile batteries of embodiments may be fabricated using processes in addition to or in alternative to electrodeposition (e.g., using processes such as solvothermal, chemical synthesis, etc.). However, electrodeposition techniques are preferred according to embodiments because electrodeposition techniques generally offer improved controllability and structural uniformity with respect to the yarn electrodes being formed.

Anode 110 formed from yarn electrode 101 and active layer 103 and cathode 120 formed from yarn electrode 102 and active layer 104 remain highly flexible and may be bent, knotted, etc., facilitating their use in forming conductive yarn-based nickel-zinc textile batteries 150D and 150E. Moreover, anode 110 and cathode 120 comprising corresponding yarn electrodes 101 and 102, as may be formed from a stainless steel yarn, provide excellent conductivity and strength for facilitating both manufacturing (e.g., using industrial weaving or knitting processes) and wearability of conductive yarn-based nickel-zinc textile batteries of embodiments herein. Accordingly, anode 110 and cathode 120 of embodiments are provide highly conductive yarn-based components that can endure high stresses of industrial weaving and knitting and thus are configured to facilitate such textile material processing.

One or more free-standing yarn battery assemblies, for use in weaving or knitting a conductive yarn-based nickel-zinc textile battery of embodiments, may be fabricated from anode 110 and cathode 120. In accordance with embodiments of the invention, anode 110 (or some portion thereof) is placed in active proximity (i.e., to enable electrochemical operation) to cathode 120 (or some portion thereof), such as by disposing anode 110 and cathode 120 parallelly to avoid mutual contact (e.g., as shown disposed in the electrolyte of FIG. 1C). Thereafter, anode 110 and cathode 120 may be coated with electrolyte 105 (e.g., alkali gel electrolyte comprising a polyvinyl alcohol (PVA)-based electrolyte, a polyacrylamide (PAM) based polymer electrolyte, a polyacrylate (PAAS) based electrolyte, etc.) to form yarn-based battery assembly 140 as shown in FIG. 1C.

A conductive yarn-based nickel-zinc textile battery of embodiments of the invention may be constructed by weaving (e.g., conductive yarn-based nickel-zinc textile battery 150D of FIG. 1D) or knitting (e.g., conductive yarn-based nickel-zinc textile battery 150E of FIG. 1E) one or more yarn-based battery assemblies 140 into a textile material, such as using industrial weaving (e.g., weaving machine 160 of FIG. 1D, such as may comprise a CCI Rapier weaving machine) or knitting (e.g., knitting machine 170 of FIG. 1E, such as may comprise a STOLL knitting machine) machines. For example, yarn electrode 101 and/or yarn electrode 102, such as may be comprised of stainless steel yarns, provide highly conductive yarn-based components whereby yarn-based battery assemblies 140 of embodiments herein are configured to facilitate textile material processing, including industrial weaving and knitting processes, utilized in constructing conductive yarn-based nickel-zinc textile batteries 150D and 150E. Conductive yarn-based nickel-zinc textile batteries 150D and 150E of embodiments may serve as a flexible textile-like electric power supply for wearable electronic applications (e.g., smart bands, performance monitors, medical sensors, asset tracking, and the like), standby and/or mobile use (e.g., standby or mobile power supply for communications devices, computing devices, timepieces, sensors, monitors, and the like), etc.

Conductive yarn-based nickel-zinc textile batteries 150D and 150E of embodiments, based on weavable and knittable highly conductive yarns and conductive yarn-based components which are configured to facilitate textile material processing, are particularly well suited for powering next-generation electronic products, such as to provide wearable power sources for powering personalized electronics, because of their high output voltage and their similarity with traditional textiles. Conductive yarn-based nickel-zinc textile batteries 150D and 150E of embodiments provide high capacity (e.g., much higher capacity than that of supercapacitors) using conductive yarn-based components comprised of highly conductive yarn electrodes, such as stainless steel yarn, configured to facilitate long-distance one-dimensional electronic transportation in the yarn. For example, synergistic effects between transition metal ions (e.g., bimetallic (Ni, Co) hydroxides) of embodiments present higher capacity and thus deliver higher energy density than individual transition metal counterparts. Moreover, in addition to the high electric conductivity of the yarn electrodes, the high mechanical strength of the yarn electrodes of conductive yarn-based nickel-zinc textile batteries 150D and 150E of embodiments facilitate industrial weaving and knitting (e.g., conductive yarn-based components, such as anode 110 and cathode 120, are configured to withstand tensile stress at the magnitudes present using industrial weaving and knitting machines). Embodiments of the yarn electrodes (e.g., comprising conductive yarn formed from stainless steel 316L filaments) of conductive yarn-based nickel-zinc textile batteries herein can withstand at least 500 MPa tensile stress, and thus are well suited for use with respect to industrial weaving and knitting machines.

Exemplary embodiments of conductive yarn-based nickel-zinc textile batteries 150D and 150E fabricated in accordance with the concepts herein exhibit a high specific capacity of 5 mAh $cm^{-3}$, energy densities of 0.12 mWh $cm^{-2}$ and 8 mWh $cm^{-3}$, and power densities of 32.8 mW $cm^{-2}$ and 2.2 W $cm^{-3}$. Such implementations of conductive yarn-based nickel-zinc textile batteries are generally superior to typical aqueous batteries and supercapacitors. In particular, they demonstrate ultrahigh rate capability of 232 C (liquid-state electrolyte) and 116 C (solid-state electrolyte).

Having generally described conductive yarn-based nickel-zinc textile batteries, and their fabrication, according concepts of the present invention, further detail is provided below to aid in the understanding of the concepts herein. It should be appreciated that, although the following details are provided with reference to specific examples for a better understanding of concepts herein, the invention is not limited to applicability with respect to the particular examples given.

In the synthesis of conductive yarns utilized according to embodiments of the invention (e.g., providing anode 110 comprised of yarn electrode 101 and active layer 103 and cathode 120 comprised of yarn electrode 102 and active layer 104) stainless steel 316L may be continuously spun to ultrathin filaments (e.g., micro-sized monofilaments, such as may have diameters in the range of 10-50 nm) and the resulting filaments used to form yarns (e.g., yarn electrode 200 of FIG. 2, such as may correspond to either or both of yarn electrodes 101 and 102 of FIGS. 1A-1C). Conductive yarns of embodiments herein may, for example, comprise bundles or plies (e.g., bundles 201 and 202 of FIG. 2, such as may each have diameters in the range of 30-50 μm) comprised of a plurality of filaments (e.g., from 1,000 to 20,000 filaments), wherein the bundles are twisted together to form a conductive yarn or cord (e.g., 2 to 10 bundles may be twisted to form a conductive yarn having a diameter of 180-250 μm). The as-drawn highly conductive long yarns of embodiments are as flexible as cotton yarns, such as may be facilitated by the flexibility of micron-sized stainless steel 316L, filaments. For example, the average diameter of stainless steel filaments comprising conductive yarns of embodiments is 1-10 μm and the resulting conductive yarn of embodiments has a diameter of 180-250 μm, which is similar to that of cotton yarns.

In accordance with embodiments of the invention, the good electrical conductivity of the conductive yarn (e.g., stainless steel 316L yarn) of the yarn electrodes (e.g., yarn electrodes 101 and 102) facilitates one-dimensional long-distance electron transport and uniform electrodeposition of materials of the active layers (e.g., active layers 103 and 104) of the conductive yarn-based components (e.g., anode 110 and cathode 120) utilized in constructing conductive yarn-based nickel-zinc textile batteries (e.g., conductive yarn-based nickel-zinc textile batteries 150D and 150E) in accordance with the concepts herein. Moreover, the conductive yarns, and the components fabricated therefrom, of embodiments of the invention can undergo industrial weaving and knitting. Additionally or alternatively, the conductive yarns, and the components fabricated therefrom, of embodiments of the invention can endure hand weaving and/or knitting to make various arbitrary patterns without breakage.

FIG. 3 shows length capacity with respect to the length of the yarn electrode of the exemplary yarn-based battery assembly. It should be appreciated that the capacity normalized to the length of conductive yarns decreases with the increase of length. In contrast, the highly conductive stainless steel yarn of the exemplary yarn-based battery assembly provides an almost constant capacity per length, as shown in FIG. 3. The excellent conductivity of the conductive yarn utilized according to embodiments makes electron transport fast and the small ohmic resistance of yarns ignorable in the electrochemical dynamic processes. Moreover, the excellent conductivity of the conductive yarn utilized according to embodiments facilitates uniform coating of the multiple tiny filaments thereof with Zn nanoflakes (anode) and ultrathin mesoporous NCHO nanosheets (cathode), therefore providing maximum surface for the electrochemical processes.

Conductive yarn-based components (e.g., anode 110 and cathode 120) utilized in constructing conductive yarn-based nickel-zinc textile batteries (e.g., conductive yarn-based nickel-zinc textile batteries 150D and 150E) of embodiments are produced by depositing Zn (anode) and NCHO (cathode), such as growth by electrodeposition, upon the conductive yarns of the yarn electrodes. In accordance with embodiments of the invention, before electrodeposition, the as-drawn conductive yarns may be hydrothermally treated in an alkaline solution, such as to utilized hydrophilic hydroxyl groups to improve the wettability of the yarn surface and thus favor the uniform electrodeposition of Zn and NCHO. For example, a process to hydrothermally treat conductive yarns of embodiments may comprise cleaning pristine stainless steel 316L conductive yarns by acetone, ethanol, and deionized water, placing the cleaned conductive yarns into a Teflon-lined stainless steel autoclave containing alkaline solution (e.g., a concentration of alkaline solution of 0.5-3 M) for hydro-thermal treatment, and after the hydro-thermal treatment cleaning and drying the now activated conductive yarn battery. The high conductivity of the yarn electrodes and wettability-induced uniform deposition of active layers according to embodiments facilitates achieving high performance batteries.

Figure 4A:
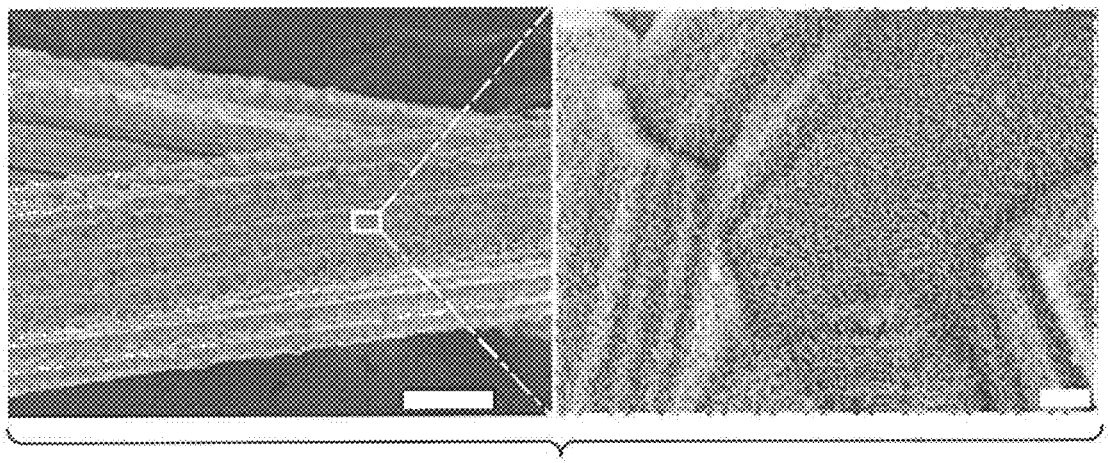
FIG. 4A shows a conductive yarn electrodeposited with zinc in accordance with embodiments of the present invention.

Zn nanoflakes are grown uniformly on the filaments of the conductive yarn of an anode (e.g., as illustrated in FIG. 4A showing yarn electrodeposited with Zn, wherein the scale bar is 100 μm, and the Zn nanoflake structure is shown in the insert view, wherein the scale bar is 1 μm) according to embodiments of the invention. For example, electroplating may be utilized to obtain a Zn anode with the foregoing nanoflake structure. In accordance with embodiments herein, the foregoing Zn anode may be obtained by immersing the aforementioned activated conductive yarn into zinc salt solution (e.g., a zinc salt solution having a concentration of 0.2-3 M) at room temperature, then using a Zn plate as the counter electrode to electrodeposit (e.g., using an electrodeposition time of 1.0-600 s) Zn onto the activated conductive yarn.

Figure 4B:
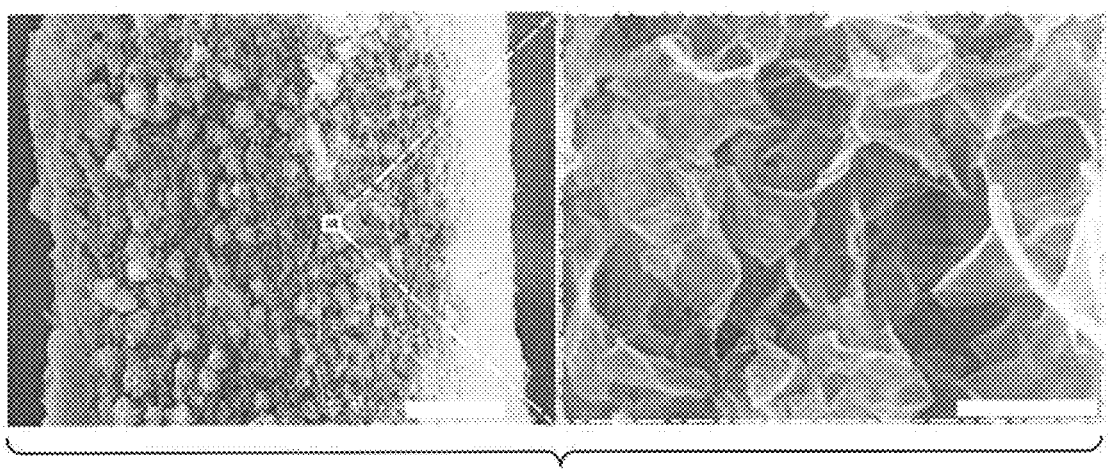
FIG. 4B shows a conductive yarn electrodeposited with nickel cobalt hydroxide in accordance with embodiments of the present invention.

NCHO ultrathin mesoporous nanosheets are grown uniformly on the filaments of the conductive yarn of a cathode (e.g., as illustrated in FIG. 4B showing yarn electrodeposited with NCHO, wherein the scale bar is 50 μm, and the ultrathin NCHO mesoporous nanosheet structure is shown in the insert view, wherein the scale bar is 500 nm) according to embodiments of the invention. The atomic ratio of NCHO is ca. 1:1:3 (Ni/Co/O), which is consistent with that of Ni to Co in the precursor electrolyte. A mesoporous nanosheet structure is typical in transition of metal oxides/hydroxides such as Ni, Co, Ni—Co, etc. Various synthesis methods like electrodeposition and solvothermal can obtain a mesoporous nanosheet structure with similar pore size around 100-300 nm, which desired according to embodiments for the superior electrochemical performances. In accordance with embodiments herein, the foregoing NCHO cathode may be obtained by immersing the aforementioned activated conductive yarn into nickel salt (e.g., nickel salt having a concentration of 1-100 mM) and cobalt salt (e.g., cobalt salt having a concentration of 1-100 mM) solution, then using a Pt plate as the counter electrode to electrodeposit (e.g., using an electrodeposition time can be 1-600 min) nickel cobalt hydroxide on the activated conductive yarn.

The nanoflake and nanosheet structures of the active layers (e.g., active layer 103 of anode 110 and active layer 104 of cathode 120) facilitate achieving high performance batteries according to embodiments. For example, nanoflake and nanosheet structures with thin and porous features in the active layers of anodes and cathodes of conductive yarn-based nickel-zinc textile batteries of embodiments herein increase the effective surface area and enable fast ion transport during charge/discharge, which favor fast electrochemical kinetics of the battery.

Figure 5A:
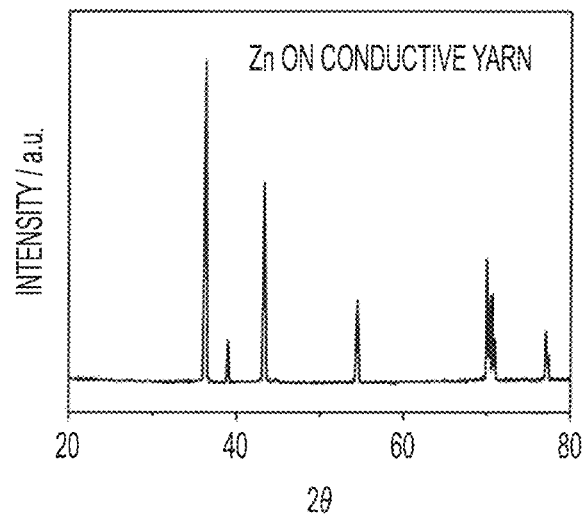
FIGS. 5A-5D show the results of X-ray diffraction and X-ray photoelectron spectroscopy investigation of exemplary zinc and nickel cobalt hydroxide active layers as-electrodeposited on a stainless steel yarn in accordance with embodiments of the present invention.
Figure 5B:
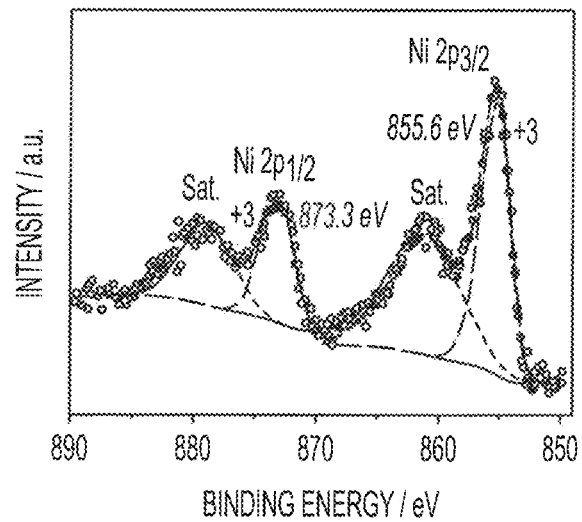
Figure 5C:
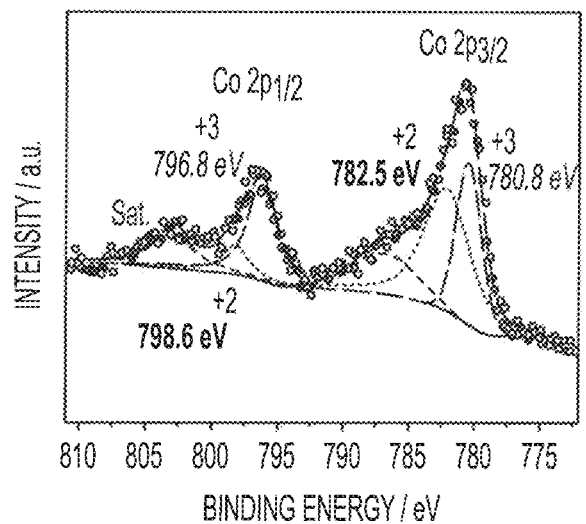
Figure 5D:
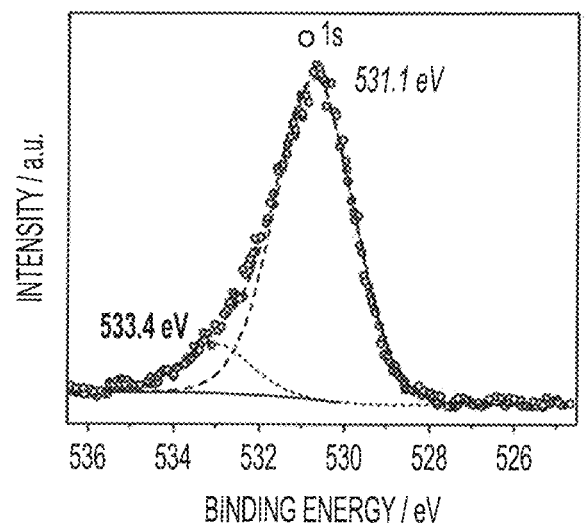

FIGS. 5A-5D show the results of X-ray diffraction (XRD) and X-ray photoelectron spectroscopy (XPS) investigation of exemplary Zn and NCHO active layers as-electrodeposited on an example of stainless steel yarn in accordance with concepts of the present invention. The XRD pattern of FIG. 5A shows a crystalline structure of the Zn as electroplated on the conductive yarn. The elemental composition and oxidation states of NCHO can be obtained from XPS, as shown in FIGS. 5B-5D. As shown in FIG. 5B, besides two satellite peaks noted as "Sat." in the graph, the XPS spectrum of Ni 2p of the NCHO as electroplated on the conductive yarn contains typical peaks located at 855.6 and 873.3 eV, characteristic of $Ni^{3+}$. The XPS spectrum of Co 2p of the NCHO as electroplated on the conductive yarn suggests the existence of $Co^{3+}$ and $Co^{2+}$, as shown in FIG. 5C. The atomic ratio of $Co^{3+}$ to $Co^{2+}$ is calculated to be 1:1 according to their peak areas integrated from the XPS spectrum. The XPS spectrum of O 1s of the ultrathin mesoporous NCHO nanosheets of the NCHO as electroplated on the conductive yarn shows OH groups at 531.1 eV and defect sites at 533.4 eV, which are usually observed in nanostructured materials, as shown in FIG. 5D. These data show that the surface composition of the hydroxylated NCHO contains $Ni^{3+}$, $Co^{3+}$, and $Co^{2+}$. Combined with the aforementioned elemental atomic ratio, the formula of NCHO as electroplated on the conductive yarn in this example could thus be approximately expressed as $Ni^{3+}Co^{2+}_{0.5}Co^{3+}_{0.5}O_3H_{0.5}$.

In optimizing the Zn and NCHO electrodes of embodiments, it should be appreciated that the time of electrodeposition affects the electrochemical performance of NCHO. For example, the capacity of the resulting battery generally increases with the NCHO electrodeposition time and then decreases as the NCHO electrodeposition time is increased beyond some threshold time (e.g., 20 m). In addition, in the absence of Ni or Co the capacity of the resulting battery is inferior to that of the bimetallic NCHO (e.g., due to the synergistic effect between Ni and Co that $Co^{3+}$ accommodates the detrimental Jahn-Teller distortion of $Ni^{3+}$ and therefore stabilizes their framework). In contrast, to the electrodeposition affects the electrochemical performance of NCHO, the time of electrodeposition generally does not affect its electrochemical performance. For example, in the time of Zn electroplating studied, Zn was always over the amount necessary for desired electrochemical performance, and therefore the capacity of the resulting battery was found to only slightly increase with the Zn electrodeposition time. From the foregoing, it was determined that electrodeposition of Zn for approximately 10 s can achieve enough anode material. It should be noted, however, that electrodeposition Zn should not be continued for too long according to embodiments because too thick of a Zn layer impairs the flexibility of yarn electrode. Accordingly embodiments provide for an electrodeposition time of Zn in the range of 10-60 s.

In utilizing the foregoing exemplary yarn-based components for the fabrication of free-standing yarn batteries (e.g., yarn-based battery assembly 140) configured for fabricating conductive yarn-based nickel-zinc textile batteries of embodiments of the invention, a gel electrolyte configured to serve as a separator to maintain separation of the anode and cathode may be coated on the electrodeposited Zn and NCHO without binder or separator. For example, the PVA for a PVA-based gel electrolyte of embodiments may be prepared by polymerizing vinyl acetate, and the resulting polyvinylacetate converted to the PVA. The PVA, KOH, and $Zn(CH_3COO)_2$ may be dissolved in deionized water at 90° C. to form a PVA-based gel electrolyte, wherein the resulting gel electrolyte may be cured at room temperature. In optimizing the PVA based gel electrolyte of embodiments, a liquid electrolyte is prepared to be 6 M KOH due to its good ionic conductivity and low viscosity. In an embodiment where sodium polyacrylate (PAAS) is used to serve as alkaline gel electrolyte, a PAAS gel electrolyte may be obtained by mixing a gel monomer (e.g., acrylate), cross-linking agent (e.g., N,N'-Methylenebisacrylamide), and initiator (e.g., ammonium persulfate, potassium persulfate, 2,2'-Azobis(2-methylpropionitrile), etc.) with an alkaline electrolyte solution (e.g., a solution of sodium hydrate or potassium hydrate, and at least one divalent zinc salt) and sodium hydroxide added to neutralize acrylate (e.g., a mole ratio of acrylate monomer and sodium hydroxide of 1:1), then curing at room temperature or a higher temperature.

FIGS. 6A-6D show electrochemical performance characteristics of exemplary yarn-based battery assemblies (e.g., yarn-based battery assembly 140) comprising conductive yarn-based components (e.g., anode 110 and cathode 120) and liquid PVA-based gel electrolyte (e.g., electrolyte 105) provided in accordance with the above exemplary embodiments. That is, FIGS. 6A-6D show electrochemical performance characteristics of exemplary liquid-state yarn-based battery assemblies. As shown in the current density to Voltage (CV) curve of FIG. 6A (CV at 5 mV/s), the exemplary yarn-based battery assembly shows strong redox peaks at ≈1.65 and ≈1.85 V, which are responsible to the overall electrochemical reaction:

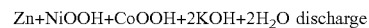
$Zn+NiOOH+CoOOH+2KOH+2H_2O$ discharge

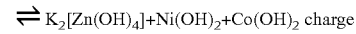
$\rightleftharpoons K_2[Zn(OH)_4]+Ni(OH)_2+Co(OH)_2$ charge

FIG. 6B shows the galvanostatic charge-discharge (GCD) curves for the exemplary yarn-based battery assembly from 0.031 to 5 A $cm^{-3}$ (normalized to the sum of two yarn electrodes), corresponding to 1.45 to 232 C (1 C=242 mAh $g^{-1}$ NCHO). Such high rate capability reveals that yarn-based battery assemblies provided in accordance with the concepts herein endure fast charging. The GCD curves of FIG. 6B demonstrate charge and discharge plateaus with a small voltage hysteresis of ≈0.1 V. Specific capacities normalized to volume of the two yarn electrodes are shown in FIG. 6C. At a low current density of 31 mA $cm^{-3}$, which corresponds to 0.54 h discharge time, the exemplary yarn-based battery assembly delivers a high capacity of 16.6 mAh $cm^{-3}$ (normalized to the sum of two yarn electrodes). It should be appreciated that the foregoing shows a high capacity as compared to reported fiber-based energy storage devices, even when compared with those values calculated from single yarn electrode. It should be appreciated that it has been found that the bare stainless steel yarn barely contributes capacity, and thus the potential effect of Ni—Fe can be ruled out with respect to the above high capacity of the exemplary yarn-based battery assembly. A relatively high percentage (e.g., 65% and 51%) of the initial capacity is expected to be maintained when the current density is increased substantially (e.g., 40 and 80 times, respectively), demonstrating the excellent rate capability of yarn-based battery assemblies of embodiments of the invention. FIG. 6D shows capacity retention of the exemplary yarn-based battery assembly during change/discharge cycles. As can be seen in FIG. 6D, the exemplary yarn based battery assembly retains 60% capacity after 1000 cycles, demonstrating better performance stability than other batteries, such as NiO//Zn (65% after 500 cycles), $Ni(OH)_2//Bi_2O_3$ (60% after 200 cycles), Zn//$LiFePO_4$ (≈78% after 400 cycles) etc.

Figure 7A:
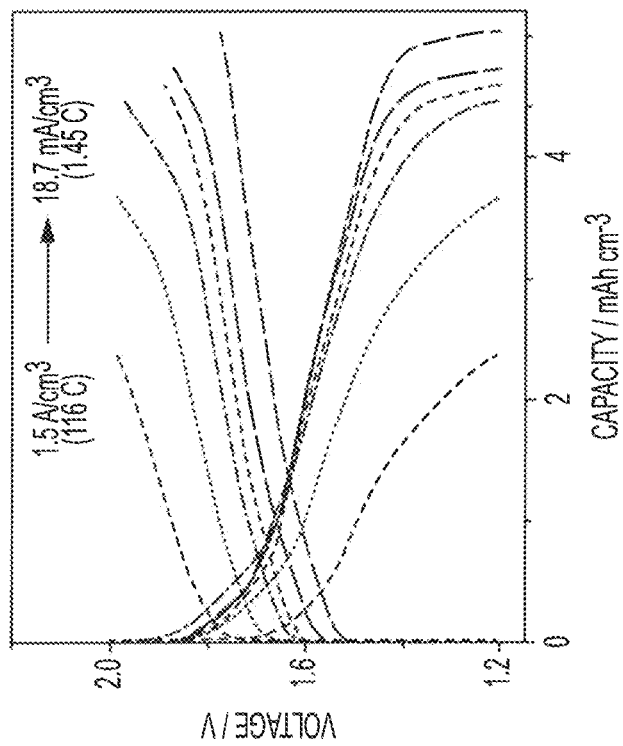
FIGS. 7A and 7B show electrochemical performance characteristics of exemplary yarn-based battery assemblies comprising a solid electrolyte in accordance with embodiments of the present invention.
Figure 7B:
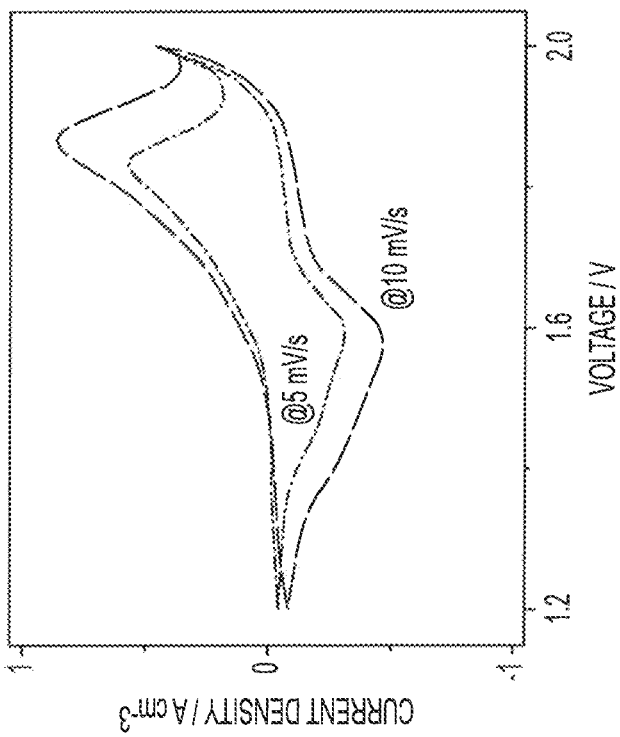

FIGS. 7A and 7B show electrochemical performance characteristics of exemplary yarn-based battery assemblies (e.g., yarn-based battery assembly 140) comprising conductive yarn-based components (e.g., anode 110 and cathode 120) and solid PVA-based electrolyte (e.g., electrolyte 105) provided in accordance with the above exemplary embodiments. That is, FIGS. 7A and 7B show electrochemical performance characteristics of exemplary solid-state yarn-based battery assemblies. To fabricate the exemplary solid-state yarn-based battery, two parallel yarn electrodes were coated with a PVA-KOH—Zn(CH$_3$COO)$_2$ gel electrolyte without binder or separator. The total volume of yarn-based battery assembly, including the two yarn electrodes and the surrounding solid electrolyte, is estimated to be 0.00375 cm$^3$. The exemplary yarn-based battery assembly exhibited the CV curves (CV at 5 mV/s and 10 mV/s) shown in FIG. 7A and the GCD profiles from 18.7 mA cm$^{-3}$ (1.45 C) to 1.5 A cm$^{-3}$ (116 C) shown in FIG. 7B. It should be appreciated that the specific capacity of 5 mAh cm$^{-3}$ achieved (based on the whole battery) outperforms many single yarn electrodes, even measured in liquid electrolytes.

Figure 8A:
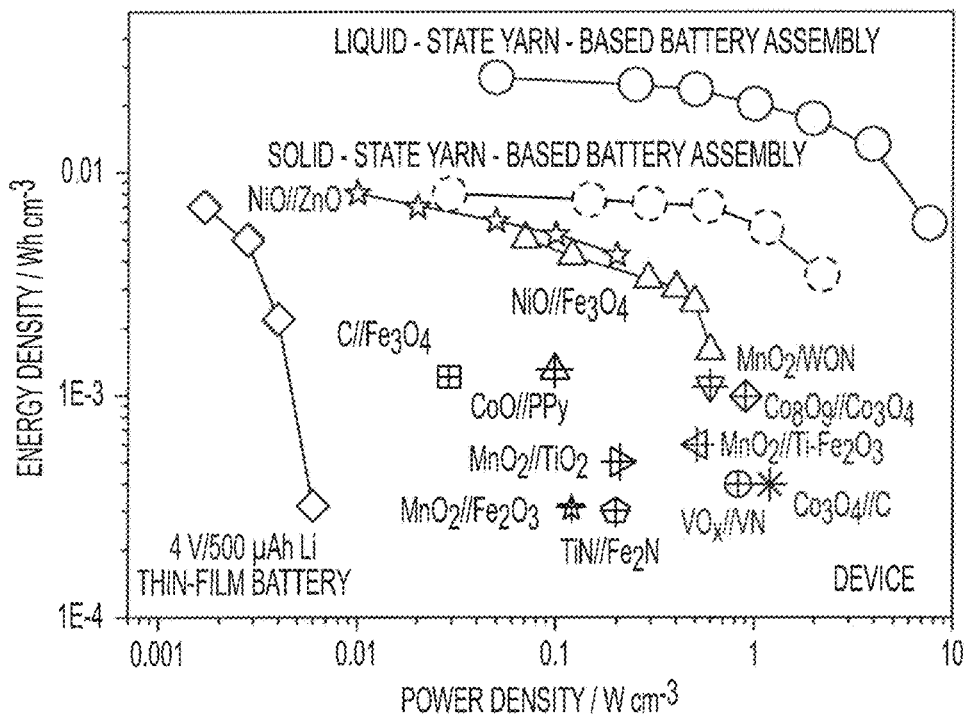
FIG. 8A shows a Ragone plot comparing yarn-based battery assemblies of embodiments of the present invention with asymmetric supercapacitors.
Figure 8B:
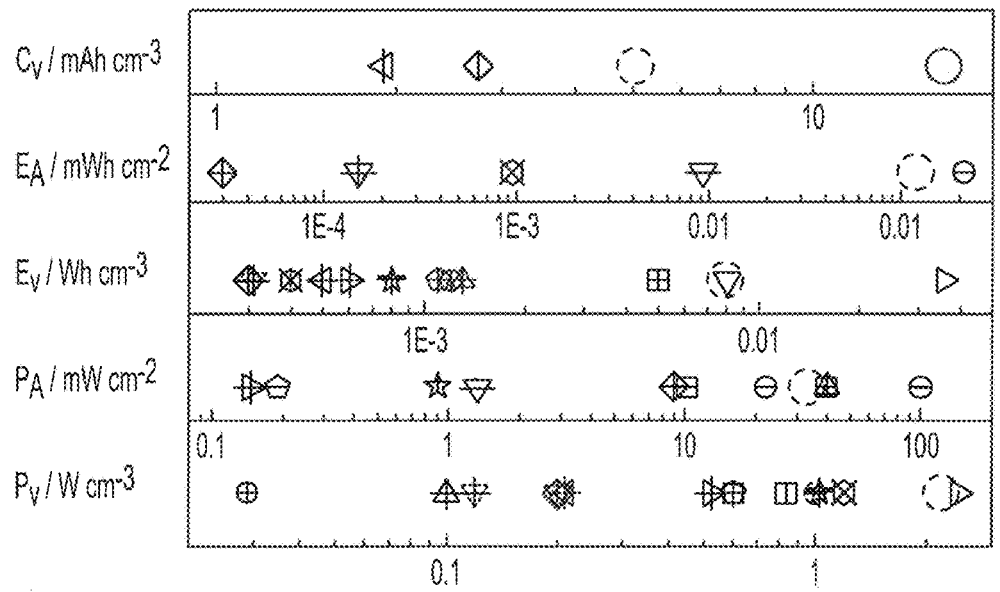
FIG. 8B shows electrochemical performance characteristics of yarn-based battery assemblies of embodiments of the present invention and supercapacitors.

The yarn-based battery assemblies in accordance with the foregoing examples deliver maximum volumetric/areal energy densities of 8 mWh cm$^{-3}$ (exemplary solid-state yarn based battery assembly) and 0.12 mWh cm$^{-3}$ (exemplary liquid-state yarn-based battery assembly) and power densities of 2.2 W cm$^{-3}$ (exemplary solid-state yarn-based battery assembly) and 33 mW cm$^{-3}$ (exemplary liquid-state yarn-based battery assembly), as shown in FIG. 8A. It can be appreciated from the data of FIG. 8A that this performance is considerably superior to the performance of a Ni//Zn battery, a Ni//Fe battery, a Li thin-film battery, and asymmetric supercapacitors. FIG. 8B shows electrochemical performance characteristics, including volumetric capacities ($C_V$), areal ($E_A$) and volumetric ($E_V$) energy densities, areal ($P_A$) and volumetric ($P_V$) power densities, of yarn-based battery assemblies of embodiments of the present invention and supercapacitors. The energy and power densities exhibited by yarn-based battery assemblies of embodiments herein are among the highest values to date, as shown in FIG. 8B (wherein reference 10 is Huang, Y.; Hu, H.; Huang, Y.; Zhu, M. S.; Meng, W. J.; Liu, C.; Pei, Z. X.; Hao, C. L.; Wang, Z. K.; Zhi, C. Y. From Industrially Weavable and Knittable Highly Conductive Yarns to Large Wearable Energy Storage Textiles. ACS Nano 2015, 9, 4766-4775, reference 16 is Liu, J. P.; Guan, C.; Zhou, C.; Fan, Z.; Ke, Q. Q.; Zhang, Z.; Liu, C.; Wang, J. A Flexible Quasi-Solid-State Nickel-Zinc Battery with High Energy and Power Densities Based on 3D Electrode Design, Adv. Mater. 2016, 28, 8732-8739, reference 17 is Xu, J.; Wang, Q. F.; Wang, X. W.; Xiang, Q. Y.; Liang, B.; Chen, D.; Shen, G. Z. Flexible Asymmetric Supercapacitors Based Upon Co9S8 Nanorod// Co3O4@RuO2 Nanosheet Arrays on Carbon Cloth. ACS Nano 2013, 7, 5453-5462, reference 18 is Yu, D. S.; Goh, K. L.; Zhang, Q.; Wei, L.; Wang, H.; Jiang, W. C.; Chen, Y. Controlled Functionalization of Carbonaceous Fibers for Asymmetric Solid-State Micro-Supercapacitors with High Volumetric Energy Density. Adv. Mater, 2014, 26, 6790-6797, reference 24 is Guan, C.; Zhao, W.; Hu, Y. T.; Ke, Q. Q.; Li, X.; Zhang, H.; Wang, J. High-Performance Flexible Solid-State Ni/Fe Battery Consisting of Metal Oxides Coated Carbon Cloth/Carbon Nanofiber Electrodes. Adv. Energy Mater. 2016, 6, 1601034, reference 25 is Yu, D. S.; Goh, K.; Wang, H.; Wei, L.; Jiang, W. C.; Zhang, Q.; Dai, L. M.; Chen, Y. Scalable Synthesis of Hierarchically Structured Carbon Nanotube-Graphene Fibres for Capacitive Energy Storage. Nat. Nanotechnol. 2014, 9, 555-562, reference 26 is Li, R. Z.; Wang, Y. M.; Zhou, C.; Wang, C.; Ba, X.; Li, Y. Y.; Huang, X. T.; Liu, J. P. Carbon-Stabilized High-Capacity Ferroferric Oxide Nanorod Array for Flexible Solid-State Alkaline Battery-Supercapacitor Hybrid Device with High Environmental Suitability. Adv. Funct. Mater. 2015, 25, 5384-5394, reference 27 is Zhou, C.; Zhang, Y. W.; Li, Y. Y.; Liu, J. P. Construction of High-Capacitance 3D CoO@Polypyrrole Nanowire Array Electrode for Aqueous Asymmetric Supercapacitor. Nano Lett. 2013, 13, 2078-2085, reference 28 is Lu, X. H.; Yu, M. H.; Wang, G. M.; Zhai, T.; Xie, S. L.; Ling, Y. C.; Tong, Y. X.; Li, Y. H—TiO2@MnO2//H—TiO2@C Core-Shell Nanowires for High Performance and Flexible Asymmetric Supercapacitors. Adv. Mater. 2013, 25, 267-272, reference 29 is Yang, P. H.; Ding, Y.; Lin, Z. Y.; Chen, Z. W.; Li. Y. Z.; Qiang, F.; Ebrahimi, M.; Mai, W, J.; Wong, C. P.; Wang, Z. L. Low-Cost High-Performance Solid-State Asymmetric Supercapacitors Based on MnO2 Nanowires and Fe2O3 Nanotubes. Nano Lett. 2014, 14, 731-736, reference 30 is Zhu, C. R.; Yang, P. H.; Chao, D. L.; Wang, X. L.; Zhang, X.; Chen, S.; Tay, B. K.; Huang, H.; Zhang, H.; Mai, W. J.; Fan, H. J. All Metal Nitrides Solid-State Asymmetric Supercapacitors. Adv. Mater. 2015, 27, 4566-4571, reference 31 is Yu, M. H.; Han, Y.; Cheng, X. Y.; Hu, L.; Zeng, Y. X.; Chen, M. Q.; Cheng, F. L.; Lu, X. H.; Tong, Y. X. Holey Tungsten Oxynitride Nanowires: Novel Anodes Efficiently Integrate Microbial Chemical Energy Conversion and Electrochemical Energy Storage. Adv. Mater. 2015, 27, 3085-3091, reference 32 is Zeng, Y. X.; Han, Y.; Zhao, Y. T.; Zeng, Y.; Yu, M. H.; Liu, Y. J.; Tang, H. L.; Tong, Y. X.; Lu, X. H. Advanced Ti-Doped Fe2O3@PEDOT Core/Shell Anode for High-Energy Asymmetric Supercapacitors. Adv. Energy Mater. 2015, 5, 1402176, reference 33 is Lu, X. H.; Yu, M. H.; Zhai, T.; Wang, G. M.; Xie, S. L.; Liu, T. Y.; Liang, C. L.; Tong, Y. X.; Li, Y. High Energy Density Asymmetric Quasi-Solid-State Supercapacitor Based on Porous Vanadium Nitride Nanowire Anode. Nano Lett. 2013, 13, 2628-2633, reference 34 is Wang, X. F.; Liu, B.; Liu, R.; Wang, Q. F.; Hou, X. J.; Chen, D.; Wang, R. M.; Shen, G. Z. Fiber-Based Flexible All-Solid-State Asymmetric Supercapacitors for Integrated Photodetecting System. Angew. Chem., Int. Ed. 2014, 53, 1849-1853, reference 35 is Bae, J.; Song, M. K.; Park, Y. Kim, J. M.; Liu, M. L.; Wang, Z. L. Fiber Supercapacitors Made of Nanowire-Fiber Hybrid Structures for Wearable/Flexible Energy Storage. Angew. Chem., Int. Ed. 2011, 50, 1683-1687, reference 36 is Chen, T.; Qiu, L, B.; Yang, Z. B.; Cai, Z. B.; Ren, J.; Li, H. P.; Lin, H. J.; Sun, X. M.; Peng, H. S. An Integrated "Energy Wire" for Both Photoelectric Conversion and Energy Storage. Angew. Chem., Int. Ed. 2012, 51, 11977-11980, reference 37 is Pikul, J. H.; Zhang, H, G.; Cho, J.; Braun, P. V.; King, W. P. High-Power Lithium Ion Microbatteries from Interdigitated Three-Dimensional Bicontinuous Nanoporous Electrodes. Nat. Commun. 2013, 4, 1732, reference 38 is Ren, J.; Li, L.; Chen, C.; Chen, X. L.; Cai, Z. B.; Qiu, L. B.; Wang, Y. G.; Zhu, X. R.; Peng, H. S, Twisting Carbon Nanotube Fibers for Both Wire-Shaped Micro-Supercapacitor and Micro-Battery. Adv. Mater. 2013, 25, 1155-1159, reference 39 is Wu, X. C.; Lu, Z. Y.; Zhu, W.; Yang, Q.; Zhang, G. X.; Liu, J. F.; Sun, X. M. High-Performance Aqueous Battery with Double Hierarchical Nanoarrays, Nano Energy 2014, 10, 229-234, reference 40 is Sun, K.; Wei, T. S.; Ahn, B. Y.; Seo, J. Y.; Dillon, S. J.; Lewis, J. A. 3D Printing of Interdigitated Li-Ion Microbattery Architectures. Adv. Mater. 2013, 25, 4539-4543, reference 41 is Wang, H. L.; Liang, Y. Y.; Gong, M.; Li, Y. G.; Chang, W.; Mefford, T.; Zhou, J. G.; Wang, J.; Regier, T.; Wei, F.; Dai, H. J. An Ultrafast Nickel-Iron Battery from Strongly Coupled Inorganic Nanoparticle/Nanocarbon Hybrid Materials. Nat. Commun. 2012, 3, 917, reference 42 is Yoshima, K.; Munakata, H.; Kanamura, K. Fabrication of Micro Lithium-Ion Battery with 3D Anode and 3D Cathode by Using Polymer Wall, J. Power Sources 2012, 208, 404-408, reference 43 is Gaikwad, A. M.; Whiting, G. L.; Steingart, .D. A.; Arias, A. C. Highly Flexible, Printed Alkaline Batteries Based on Mesh-Embedded Electrodes. Adv. Mater. 2011, 23, 3251-3255, reference 44 is El-Kady, M. F.; Strong, V.; Dubin, S.; Kaner, R. B. Laser Scribing of High-Performance and Flexible Graphene-Based Electrochemical Capacitors, Science 2012, 335, 1326-1330, and reference 45 is Kou, L; Huang, T. Q.; Zheng, B. N.; Han, Y.; Zhao, X. L.; Gopalsamy, K.; Sun, H. Y.; Gao, C. Coaxial Wet-Spun Yarn Supercapacitors for High-Energy Density and Safe Wearable Electronics. Nat. Commun. 2014, 5, 3754, the disclosures of which are hereby incorporated herein by reference). The energy and power densities exhibited by yarn-based battery assemblies of embodiments herein are even superior to those calculated by a single electrode.

Figure 9A:
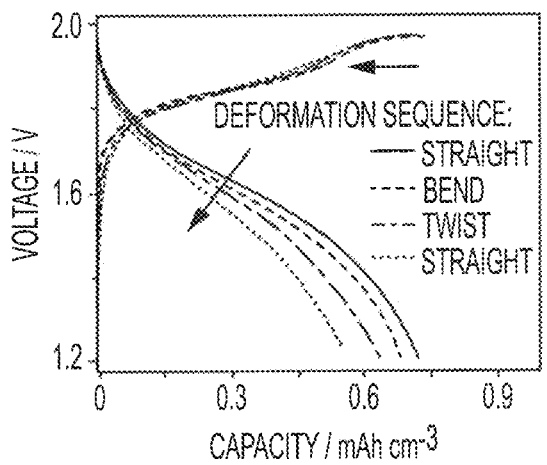
FIGS. 9A-9E show the results of flexibility tests of a yarn-based battery assembly of embodiments of the present invention.
Figure 9B:
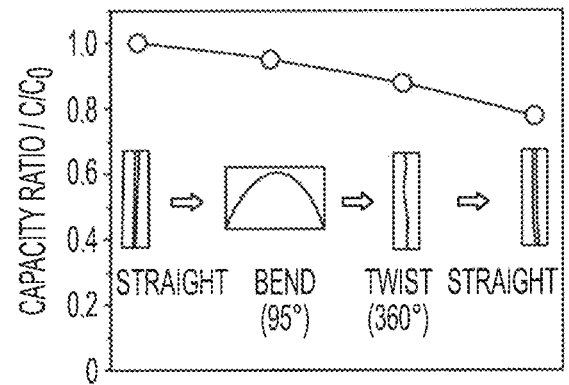
Figure 9C:
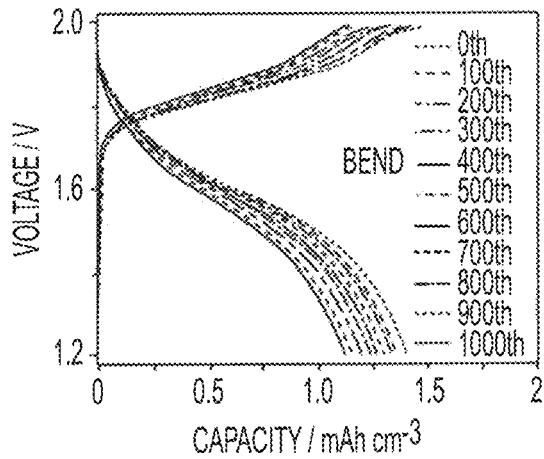
Figure 9D:
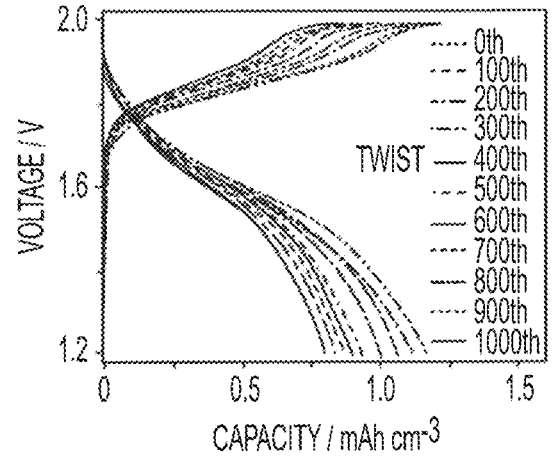
Figure 9E:
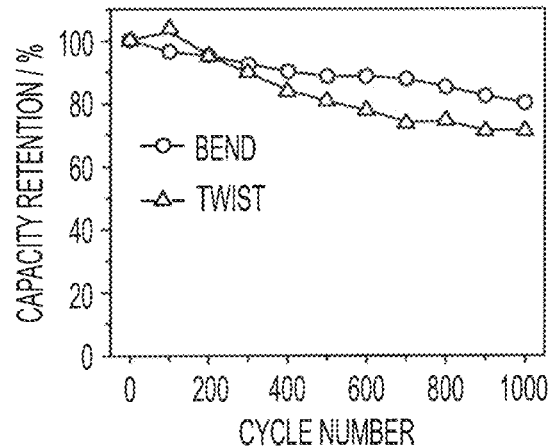

FIGS. 9A-9E show the results of flexibility tests of an exemplary yarn-based battery assembly constructed in accordance with the concepts herein. In particular, the results shown in FIGS. 9A-9E were observed with respect to a solid-state yarn battery assembly that experienced a series of deformation tests: straight, bent 95°, twisted 360°, and again straight. FIG. 9A shows GCD curves for the exemplary yarn-based batter assemblies under consecutive deformations. The charge curves almost overlap completely, and discharge curves as well as capacities do not change much at various deformation states. After experiencing these non-planar deformations, the yarn-based battery assembly retained 78% of initial capacity, as shown in FIG. 9B. Cycling tests at different deformation states are shown in FIGS. 9C and 9D. Under bent 95° and twisted 360°, the exemplary yarn-based battery assembly reserves over 80 and 70% of initial capacity after 1000 times, respectively, as shown in FIG. 9E. The capacity loss is believed to have arisen from cracks formed on the electrode materials during mechanical deformation (e.g., metal oxides are vulnerable to break and produce cracks upon deformation).

Figure 10B:
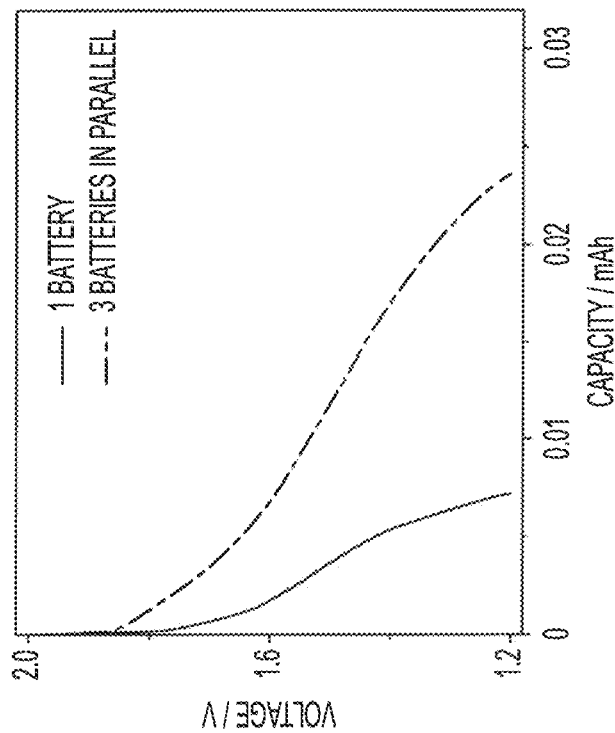
FIG. 10B shows a current window for yarn-based battery assemblies of the present invention connected in parallel.
Figure 10A:
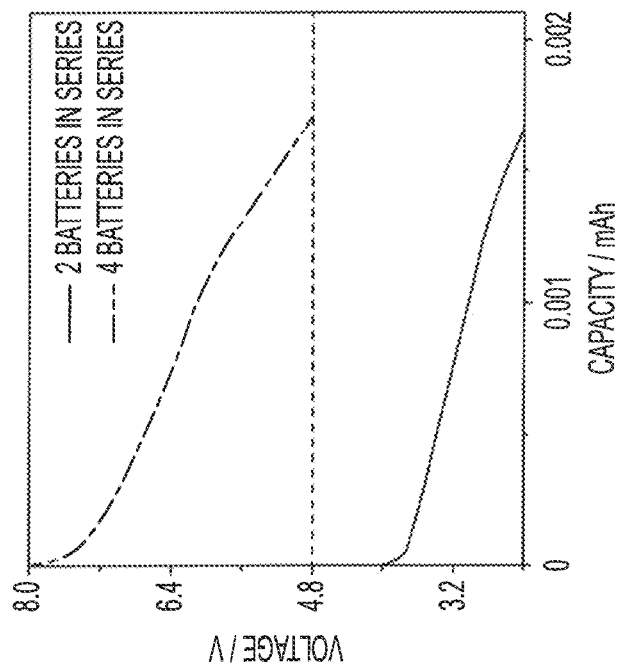
FIG. 10A shows voltage windows for yarn-based battery assemblies of embodiments of the present invention connected in series.

Multiple yarn-based battery assemblies, such as those of the examples above, may be assembled in different ways to form conductive yarn-based nickel-zinc textile batteries of embodiments of the present invention (e.g., providing wearable textile batteries made of industrially weavable highly conductive yarns). Assembling two such yarn-based battery assemblies in series has a two-fold wider voltage window (e.g., 2.4-4 V), and assembling four such yarn-based battery assemblies in series works in a four-fold window (e.g., 4.8-8 V) with similar capacity, as shown in FIG. 10A. Similarly, assembling three such yarn-based battery assemblies in parallel has a three-fold higher current, as shown in FIG. 10B, suggesting good scalability. Therefore, industrial weavability, flexibility, and scalability validate energy textiles.

To demonstrate the viability of a wearable energy storage textile comprised of a conductive yarn-based nickel-zinc textile battery formed from highly conductive yarn-based components in accordance with the concepts herein, a wrist band battery was fabricated by weaving a large conductive cloth (e.g., planar fabric piece, having one or more conductive yarn-based nickel-zinc textile battery woven into the cloth thereof, being of sufficient dimensions to enable fabrication of one or more human wearable item) from the conductive yarn-based battery assemblies with the use of an industrial weaving machine. For example, a CCI Rapier weaving machine and a STOLL knitting machine were used to easily weave and knit large cloths (e.g., ≥10 cm×10 cm), such as those comprising conductive yarn-based nickel-zinc textile batteries 150D and 150E of FIGS. 1D and 1E, respectively. Using the large conducting cloth woven by the CCI Rapier weaving machine, an energy wrist band was fabricated with four to five textile batteries connected in series. In addition to validating the weavability and wearability of the components, the resulting charged energy wrist band successfully powered a watch, a set of light-emitting diodes, and a pulse sensor, demonstrating its promising potential in personalized wearable electronics and healthcare.

As can be appreciated from the foregoing, embodiments of the invention provide a safe and high energy density nickel-zinc textile battery, such as for use with respect to next generation personalized wearable electronic applications. For example, a conductive yarn-based nickel-zinc textile battery of embodiments of the invention possesses a battery level capacity and energy density, as well as a supercapacitor level power density due to utilization of highly conductive yarn as current collectors, which facilitates one-dimensional long-distance electron transport and uniform electrodeposition of active materials. Conductive yarn-based nickel-zinc textile batteries of embodiments are wearable (e.g., exhibiting excellent wearing compatibility), and can be easily weaved and knitted to any size by using yarn batteries by an industrial weaving machine. Moreover, conductive yarn-based nickel-zinc textile batteries of embodiments are very cost effective and are more reliable than the existing technology.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A yarn-based textile battery comprising:
a woven or knitted fabric piece in which media of fabric cloth of the fabric piece includes at least one yarn-based battery assembly woven or knitted therein, wherein each yarn-based battery assembly of the at least one yarn-based battery assembly includes an anode formed from a first stainless steel yarn electrode and a cathode formed from a second stainless steel yarn electrode disposed parallelly in an electrolyte to avoid mutual contact, wherein the anode comprises an active layer of a zinc material coated on a surface of the first stainless steel yarn electrode, wherein the cathode comprises an active layer of a nickel material coated on a surface of the second stainless steel yarn electrode, and wherein the active layer of the zinc material comprises zinc nanoflakes and/or the active layer of the nickel material comprises nickel cobalt hydroxide nanosheets.

2. The yarn-based textile battery of claim 1, wherein the electrolyte comprises an alkaline gel electrolyte in a solid-state.

3. The yarn-based textile battery of claim 2, wherein the alkaline gel electrolyte comprises a polyvinyl alcohol-based electrolyte.

4. The yarn-based textile battery of claim 1, wherein the first stainless steel yarn electrode and the second stainless steel yarn electrode comprise stainless steel 316 L conductive yarns.

5. The yarn-based textile battery of claim 1, wherein the first stainless steel yarn electrode and the second stainless steel yarn electrode each comprise a plurality of bundles of stainless steel filaments twisted together to form a yarn structure.

6. The yarn-based textile battery of claim 5, wherein the stainless steel filaments each have a diameter in the range of 10-50 nm, wherein each bundle of the plurality of bundles of stainless steel filaments have a diameter in the range of 30-50 μm, and the first and second stainless steel yarn electrodes have a diameter in the range of 180-250 μm.

7. The yarn-based textile battery of claim 1, wherein the at least one yarn-based battery assembly comprises:
a plurality of yarn-based battery assemblies operatively connected in a parallel battery configuration.

8. The yarn-based textile battery of claim 1, wherein the at least one yarn-based battery assembly comprises:
a plurality of yarn-based battery assemblies operatively connected in series battery configuration.

9. The yarn-based textile battery of claim 1, wherein the fabric piece including the at least one yarn-based battery assembly is woven by an industrial weaving machine.

10. The yarn-based textile battery of claim 1, wherein the fabric piece including the at least one yarn-based battery assembly is knitted by an industrial knitting machine.

11. A method for forming a yarn-based textile battery, the method comprising:
providing at least one yarn-based battery assembly configured for use as media for a woven or knitted fabric, wherein each yarn-based battery assembly of the at least one yarn-based battery assembly includes an anode formed from a first stainless steel yarn electrode and a cathode formed from a second stainless steel yarn electrode disposed in an electrolyte, wherein providing the at least one yarn-based battery assembly comprises:
coating the first stainless steel yarn electrode with an active layer of a zinc material to form the anode, wherein coating the first stainless steel yarn electrode with the zinc material comprises:
electrodepositing the zinc material to provide an active layer of zinc nanoflakes; and
coating the second stainless steel yarn electrode with an active layer of a nickel material to form the cathode; and
weaving or knitting a fabric piece from yarn media including the at least one yarn-based battery assembly, wherein woven or knitted fabric cloth of the fabric piece includes the at least one yarn-based battery assembly woven or knitted therein.

12. The method of claim 11, wherein the electrodepositing the zinc material comprises:
immersing the first stainless steel yarn electrode into zinc salt solution; and
using a zinc plate as a counter electrode to electrodeposit the zinc onto the first stainless steel yarn electrode, wherein the zinc salt solution has a concentration of 0.2-3 M and electrodeposition time is 10-600 s.

13. A method for forming a yarn-based textile battery, the method comprising:
providing at least one yarn-based battery assembly configured for use as media for a woven or knitted fabric, wherein each yarn-based battery assembly of the at least one yarn-based battery assembly includes an anode formed from a first stainless steel yarn electrode and a cathode formed from a second stainless steel yarn electrode disposed in an electrolyte, wherein providing the at least one yarn-based battery assembly comprises:
coating the first stainless steel yarn electrode with an active layer of a zinc material to form the anode; and
coating the second stainless steel yarn electrode with an active layer of a nickel material to form the cathode, wherein coating the second stainless steel yarn electrode with the nickel material comprises:
electrodepositing the nickel material to provide an active layer of nickel cobalt hydroxide nanosheets; and
weaving or knitting a fabric piece from yarn media including the at least one yarn-based battery assembly, wherein woven or knitted fabric cloth of the fabric piece includes the at least one yarn-based battery assembly woven or knitted therein.

14. The method of claim 13, wherein the electrodepositing the nickel material comprises:
immersing the second stainless steel yarn electrode into nickel salt and cobalt salt solution; and
using a platinum plate as a counter electrode to electrodeposit the nickel cobalt hydroxide on the second stainless steel yarn electrode, wherein the nickel salt has a concentration of 1-100 mM, the cobalt salt solution has a concentration of 1-100 mM, and electrodeposition time is 1-600 min.

15. The method of claim 11, wherein providing the at least one yarn-based battery assembly further comprises:
cleaning yarns of the first stainless steel yarn electrode and the second stainless steel yarn electrode using acetone, ethanol, and deionized water;
hydro-thermally treating the yarns of the first stainless steel yarn electrode and the second stainless steel yarn electrode as cleaned in a non-stick material lined stainless steel autoclave containing alkaline solution, wherein a concentration of the alkaline solution is 0.5-3 M; and
cleaning and drying the yarns of the first stainless steel yarn electrode and the second stainless steel yarn electrode as hydro-thermally treated.

16. The method of claim 11, wherein providing the at least one yarn-based battery assembly comprises:
disposing the anode and the cathode in parallel in the electrolyte to avoid mutual contact.

17. The method of claim 16, wherein the electrolyte comprises an alkaline gel electrolyte.

18. The method of claim 17, wherein the alkaline gel electrolyte comprises a polyvinyl alcohol-based electrolyte.

19. The method of claim 17, wherein providing the at least one yarn-based battery assembly further comprises:
mixing gel monomer, crosslinking agent, and initiator with alkaline electrolyte solution to provide a liquid-state gel electrolyte; and
curing the liquid-state gel electrolyte to provide a solid-state gel electrolyte.

20. A method for forming a yarn-based textile battery, the method comprising:
provproviding at least one yarn-based battery assembly configured for use as media for a woven or knitted fabric, wherein each yarn-based battery assembly of the at least one yarn-based battery assembly includes an anode formed from a first stainless steel yarn electrode and a cathode formed from a second stainless steel yarn electrode disposed in an electrolyte, wherein providing the at least one yarn-based battery assembly comprises:
mixing gel monomer, crosslinking agent, and initiator with alkaline electrolyte solution to provide a liquid-state gel electrolyte, wherein the alkaline electrolyte solution comprises a solution of sodium hydrate or potassium hydrate, and at least one divalent zinc salt, and wherein the electrolyte comprises an alkaline gel electrolyte;
curing the liquid-state gel electrolyte to provide a solid-state gel electrolyte; and
disposing the anode and the cathode in parallel in the electrolyte to avoid mutual contact and
weaving or knitting a fabric piece from yarn media including the at least one yarn-based battery assembly, wherein woven or knitted fabric cloth of the fabric piece includes the at least one yarn-based battery assembly woven or knitted therein.

21. The method of claim 11, wherein weaving or knitting the fabric piece from yarn media including the at least one yarn-based battery assembly comprises:
weaving the fabric piece using an industrial weaving machine, wherein the at least one yarn-based battery assembly is woven into the woven fabric cloth of the fabric piece by the industrial weaving machine.

22. The method of claim 1, wherein weaving or knitting the fabric piece from yarn media including the at least one yarn-based battery assembly comprises:
knitting the fabric piece using an industrial knitting machine, wherein the at least one yarn-based battery assembly is knitted into the knitted fabric cloth of the fabric piece by the industrial knitting machine.

23. A yarn-based textile battery comprising:
a plurality of yarn-based battery assemblies woven or knitted into a fabric cloth of a woven or knitted fabric piece, wherein each yarn-based battery assembly of the plurality of yarn-based battery assemblies includes an anode formed from a first stainless steel yarn electrode and a cathode formed from a second stainless steel yarn electrode disposed in alkaline gel electrolyte to avoid mutual contact, wherein the anode of each yarn-based battery assembly comprises an active layer of a zinc material coated on a surface of the first stainless steel yarn electrode, and wherein the cathode of each yarn-based battery assembly of the plurality of yarn-based battery assemblies comprises an active layer of a nickel material coated on a surface of the second stainless steel yarn electrode, and wherein the active layer of the zinc material comprises zinc nanoflakes formed from electrodeposition of the zinc material on the surface of the first stainless steel yarn electrode and/or the active layer of the nickel material comprises nickel cobalt hydroxide nanosheets formed from electrodeposition of the nickel material on the surface of the second stainless steel yarn electrode.

24. The yarn-based textile battery of claim 23, wherein the alkaline gel electrolyte comprises a polyvinyl alcohol-based electrolyte.

25. The yarn-based textile battery of claim 23, wherein the first stainless steel yarn electrode and the second stainless steel yarn electrode comprise stainless steel 316 L conductive yarns.

26. The yarn-based textile battery of claim 23, wherein the first stainless steel yarn electrode and the second stainless steel yarn electrode of each yarn-based battery assembly of the plurality of yarn-based battery assemblies comprise stainless steel filaments each having a diameter in the range of 1-10 μm bundled in a plurality of bundles of 1,000 to 20,000 filaments, wherein the bundles of the first stainless steel yarn electrode are twisted to form the first stainless steel yarn electrode, and wherein the bundles of the second stainless steel yarn electrode are twisted to form the second stainless steel yarn electrode.

27. The yarn-based textile battery of claim 23, wherein the plurality of yarn-based battery assemblies are woven into the fabric cloth of the woven fabric piece using an industrial weaving machine.

28. The yarn-based textile battery of claim 23, wherein the plurality of yarn-based battery assemblies are knitted into the fabric cloth of the knitted fabric piece using an industrial knitting machine.

* * * * *

UNITED STATES PATENT AND TRADEMARK OFFICE
CERTIFICATE OF CORRECTION

PATENT NO. : 10,811,644 B2
APPLICATION NO. : 15/896961
DATED : October 20, 2020
INVENTOR(S) : Chunyi Zhi et al.

It is certified that error appears in the above-identified patent and that said Letters Patent is hereby corrected as shown below:

In the Specification

At Column 2, Line number 65, delete "1.2 V), Further" and replace with --1.2 V). Further--.
At Column 7, Line number 24, delete "316L, filaments" and replace with --316L filaments--.
At Column 8, Line number 33, delete "time of 1.0-600 s" and replace with --time of 10-600 s--.
At Column 11, Line number 47, delete "Zhang, Z." and replace with --Zhang, G. Z.--.
At Column 11, Line number 49, delete "Design," and replace with --Design.--.
At Column 11, Line number 53, delete "Co3O4@RuO2" and replace with --Co3O4@RuO2--.
At Column 11, Line number 58, delete "Mater," and replace with --Mater.--.
At Column 12, Line number 15, delete "Li." and replace with --Li,--.
At Column 12, Line number 16, delete "Qiang, F." and replace with --Qiang, P. F.--.
At Column 12, Line number 16, delete "Mai, W, J." and replace with --Mai, W. J.--.
At Column 12, Line number 43, delete "Park, Y." and replace with --Park, Y. J.--.
At Column 12, Line number 47, delete "Qiu, L, B." and replace with --Qiu, L. B.--.
At Column 12, Line number 51, delete "Zhang, H, G." and replace with --Zhang, H. G.--.
At Column 12, Line number 56, delete "Peng, H. S," and replace with --Peng, H. S.--.
At Column 13, Line number 6, delete "Wall," and replace with --Wall.--.
At Column 13, Line number 7, delete "Steingart, .D. A." and replace with --Steingart, D. A.--.

In the Claims

At Column 17, Claim number 20, Line number 21, delete "contact and" and replace with --contact; and--.
At Column 17, Claim number 22, Line number 34, delete "method of claim 1" and replace with --method of claim 11--.

Signed and Sealed this
Ninth Day of February, 2021

Drew Hirshfeld
*Performing the Functions and Duties of the
Under Secretary of Commerce for Intellectual Property and
Director of the United States Patent and Trademark Office*